US012314884B2

(12) United States Patent
Todd et al.

(10) Patent No.: US 12,314,884 B2
(45) Date of Patent: *May 27, 2025

(54) CONTEXT AND CONTEXTUAL HISTORY WITHIN AN OBSERVATION PLATFORM ENVIRONMENT

(71) Applicant: Theatro Labs, Inc., Richardson, TX (US)

(72) Inventors: Christopher N. Todd, Dallas, TX (US); Guy R. VanBuskirk, Greenville, SC (US); Ravi Shankar Kumar, Richardson, TX (US); Shiva Cheedella, Dallas, TX (US)

(73) Assignee: Theatro Labs, Inc., Richardson, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/381,011

(22) Filed: Oct. 17, 2023

(65) Prior Publication Data
US 2024/0046193 A1 Feb. 8, 2024

Related U.S. Application Data

(63) Continuation of application No. 17/676,191, filed on Feb. 20, 2022, now Pat. No. 11,797,904, which is a (Continued)

(51) Int. Cl.
G06Q 10/0639 (2023.01)
H04L 12/46 (2006.01)
(Continued)

(52) U.S. Cl.
CPC ... G06Q 10/06398 (2013.01); H04L 12/4625 (2013.01); H04L 51/18 (2013.01);
(Continued)

(58) Field of Classification Search
None
See application file for complete search history.

(56) References Cited

U.S. PATENT DOCUMENTS 5,712,899 A 1/1998 Pace
6,301,573 B1 10/2001 McIlwaine et al.
(Continued)

FOREIGN PATENT DOCUMENTS

EP 2679041 B1 11/2018
WO 0210926 A1 2/2002

OTHER PUBLICATIONS

Supplementary European Search Report, Application No. 12748969.8, Dec. 15, 2016, 7 pages.
(Continued)

Primary Examiner — Lashonda Jacobs-Burton

(57) ABSTRACT

A method of generating performance metrics for one or more users within an observation platform environment is described. The method includes providing one or more of the users with a communications device capable of sending a user's voice and a secondary signal containing information regarding a location of the communications device; providing an observation platform having a communications system for receiving and sending data. The observation platform comprises a computer system with a memory, and is configured to: recognize a user identity of a user, of the users; capture, from the communication device, a voice message of the user and the secondary signal; derive statistical data about employee performance of the user comprising: primary statistics, secondary statistics, and higher-order statistics from the secondary signal and the voice message; and build context and a contextual history of one of the user and the communications device based on the statistical data.

20 Claims, 2 Drawing Sheets

Related U.S. Application Data continuation of application No. 16/786,021, filed on Feb. 10, 2020, now Pat. No. 11,257,021, which is a continuation of application No. 16/195,555, filed on Nov. 19, 2018, now Pat. No. 10,558,938, which is a continuation of application No. 15/470,235, filed on Mar. 27, 2017, now Pat. No. 10,134,001, which is a continuation-in-part of application No. 15/375,725, filed on Dec. 12, 2016, now Pat. No. 9,928,529, and a continuation-in-part of application No. 14/869,167, filed on Sep. 29, 2015, now Pat. No. 10,069,781, said application No. 15/375,725 is a continuation of application No. 14/320,356, filed on Jun. 30, 2014, now Pat. No. 9,542,695, and a continuation-in-part of application No. 13/665,527, filed on Oct. 31, 2012, now abandoned, said application No. 14/320,356 is a continuation-in-part of application No. 13/665,527, filed on Oct. 31, 2012, now abandoned, and a continuation-in-part of application No. 13/401,146, filed on Feb. 21, 2012, now Pat. No. 8,948,730.

(60) Provisional application No. 62/314,106, filed on Mar. 28, 2016, provisional application No. 61/487,432, filed on May 18, 2011, provisional application No. 61/445,504, filed on Feb. 22, 2011.

(51) Int. Cl.
*H04L 51/18* (2022.01)
*H04L 67/02* (2022.01)
*H04L 67/12* (2022.01)
*H04L 67/306* (2022.01)
*H04L 67/50* (2022.01)
*G06Q 10/067* (2023.01)
*G06Q 10/101* (2023.01)

(52) U.S. Cl.
CPC .............. *H04L 67/02* (2013.01); *H04L 67/12* (2013.01); *H04L 67/306* (2013.01); *H04L 67/535* (2022.05); *G06Q 10/067* (2013.01); *G06Q 10/101* (2013.01)

(56) References Cited

U.S. PATENT DOCUMENTS

| | | |
|---|---|---|
| 6,377,927 B1 | 4/2002 | Loghmani et al. |
| 6,618,734 B1 * | 9/2003 | Williams ................ G09B 7/02 707/999.102 |
| 6,928,343 B2 | 8/2005 | Cato |
| 6,937,988 B1 | 8/2005 | Hemkumar et al. |
| 6,937,998 B1 | 8/2005 | McGlynn et al. |
| 6,996,531 B2 | 2/2006 | Korall et al. |
| 7,058,208 B2 | 6/2006 | Chang et al. |
| 7,248,881 B2 | 7/2007 | Shostak |
| 7,397,368 B2 | 7/2008 | Otto et al. |
| 7,640,511 B1 | 12/2009 | Keel et al. |
| 7,656,295 B2 | 2/2010 | Robson et al. |
| 7,748,618 B2 | 7/2010 | Vawter |
| 7,771,320 B2 | 8/2010 | Riley et al. |
| 7,925,777 B2 | 4/2011 | Levett |
| 8,055,296 B1 | 11/2011 | Persson et al. |
| 8,060,412 B2 | 11/2011 | Rosenbaum et al. |
| 8,140,340 B2 | 3/2012 | Bhogal et al. |
| 8,170,036 B1 | 5/2012 | Gunasekara et al. |
| 8,174,359 B1 | 5/2012 | Veni |
| 8,179,872 B2 | 5/2012 | Bienfait et al. |
| 8,180,377 B2 | 5/2012 | Yang et al. |
| 8,183,996 B2 | 5/2012 | Toyokawa et al. |
| 8,200,480 B2 | 6/2012 | Shectman et al. |
| 8,233,943 B1 | 7/2012 | Othmer et al. |
| 8,271,188 B2 | 9/2012 | De Koning |
| 8,352,260 B2 | 1/2013 | Sung et al. |
| 8,369,505 B2 | 2/2013 | Vuong |
| 8,392,262 B2 | 3/2013 | Mallick et al. |
| 8,473,289 B2 | 6/2013 | Jitkoff et al. |
| 8,630,851 B1 | 1/2014 | Hertschuh et al. |
| 8,699,694 B2 | 4/2014 | Chishti et al. |
| 8,798,036 B2 | 8/2014 | Küt et al. |
| 8,948,730 B2 | 2/2015 | Vanbuskirk et al. |
| 9,042,921 B2 | 5/2015 | Karmarkar |
| 9,053,449 B2 | 6/2015 | Kumar et al. |
| 9,060,050 B1 | 6/2015 | Chau et al. |
| 9,195,959 B1 | 11/2015 | Lopez et al. |
| 9,271,118 B2 | 2/2016 | Vanbuskirk et al. |
| 9,305,554 B2 | 4/2016 | Jagatheesan et al. |
| 9,311,466 B2 | 4/2016 | Headley |
| 9,349,128 B1 | 5/2016 | Kerr et al. |
| 9,407,543 B2 | 8/2016 | Russell et al. |
| 9,414,195 B2 | 8/2016 | Russell et al. |
| 9,445,232 B2 | 9/2016 | Russell et al. |
| 9,501,951 B2 | 11/2016 | Russell |
| 9,514,656 B2 | 12/2016 | Russell |
| 9,542,695 B2 | 1/2017 | Russell |
| 9,602,625 B2 | 3/2017 | Russell et al. |
| 9,665,899 B1 | 5/2017 | Nair et al. |
| 9,686,732 B2 | 6/2017 | Russell et al. |
| 9,691,047 B2 | 6/2017 | Russell et al. |
| 9,721,285 B2 | 8/2017 | Jones et al. |
| 9,928,529 B2 | 3/2018 | Russell et al. |
| 9,971,983 B2 | 5/2018 | Russell et al. |
| 9,971,984 B2 | 5/2018 | Russell et al. |
| 10,069,781 B2 | 9/2018 | Kumar et al. |
| 10,134,001 B2 | 11/2018 | Todd et al. |
| 10,204,524 B2 | 2/2019 | Russell et al. |
| 10,257,085 B2 | 4/2019 | Russel et al. |
| 10,304,094 B2 | 5/2019 | Russell et al. |
| 10,313,289 B2 | 6/2019 | Kumar et al. |
| 10,375,133 B2 | 8/2019 | Vanbuskirk et al. |
| 10,558,938 B2 | 2/2020 | Todd et al. |
| 10,574,784 B2 | 2/2020 | Russell et al. |
| 10,699,313 B2 * | 6/2020 | Russell ............ G06Q 10/06393 |
| 10,891,578 B2 * | 1/2021 | Marinescu ............... G06N 7/01 |
| 11,037,184 B2 | 6/2021 | Li et al. |
| 11,038,982 B2 | 6/2021 | Russell et al. |
| 11,257,021 B2 | 2/2022 | Todd et al. |
| 11,283,848 B2 | 3/2022 | Vanbuskirk et al. |
| 11,410,104 B2 | 8/2022 | Todd et al. |
| 11,563,826 B2 | 1/2023 | Van Buskirk et al. |
| 2002/0055866 A1 * | 5/2002 | Dewar ............... G06Q 10/0639 705/7.38 |
| 2002/0072984 A1 | 6/2002 | Rothman et al. |
| 2002/0136383 A1 | 9/2002 | Contreras |
| 2002/0143548 A1 | 10/2002 | Korall et al. |
| 2003/0065805 A1 | 4/2003 | Barnes |
| 2003/0120805 A1 | 6/2003 | Couts et al. |
| 2003/0130893 A1 | 7/2003 | Farmer |
| 2003/0154135 A1 | 8/2003 | Covington et al. |
| 2003/0236086 A1 | 12/2003 | Litwin |
| 2004/0203989 A1 | 10/2004 | Karaoguz |
| 2005/0021838 A1 | 1/2005 | Levett |
| 2005/0042593 A1 | 2/2005 | Hopkins et al. |
| 2005/0060236 A1 * | 3/2005 | Lulo ...................... G06Q 10/10 705/26.1 |
| 2005/0190772 A1 | 9/2005 | Tsai et al. |
| 2005/0213518 A1 | 9/2005 | Ahya et al. |
| 2005/0221264 A1 * | 10/2005 | Hearn .................... G06Q 30/02 434/322 |
| 2005/0245232 A1 | 11/2005 | Jakober et al. |
| 2006/0071775 A1 | 4/2006 | Otto et al. |
| 2006/0095317 A1 | 5/2006 | Brown et al. |
| 2006/0248011 A1 | 11/2006 | Hecht-Nielsen et al. |
| 2007/0046458 A1 | 3/2007 | Toyokawa et al. |
| 2007/0064913 A1 | 3/2007 | Shaffer et al. |
| 2007/0129061 A1 | 6/2007 | Ringland et al. |
| 2007/0207789 A1 * | 9/2007 | Zellner ................ H04M 3/4931 455/415 |
| 2007/0223662 A1 | 9/2007 | Jain et al. |
| 2008/0040431 A1 | 2/2008 | Bleeker et al. |
| 2008/0041937 A1 | 2/2008 | Vawter |
| 2008/0154612 A1 | 6/2008 | Evermann et al. |

(56) References Cited

U.S. PATENT DOCUMENTS

| | | |
|---|---|---|
| 2008/0159271 A1 | 7/2008 | Kutt et al. |
| 2008/0240384 A1 | 10/2008 | Suryanarayana et al. |
| 2008/0242319 A1 | 10/2008 | Paschetto et al. |
| 2008/0270249 A1 | 10/2008 | Rosenbaum et al. |
| 2008/0279133 A1 | 11/2008 | Bienfait et al. |
| 2009/0003309 A1* | 1/2009 | Bawcutt .................. H04L 45/00 370/254 |
| 2009/0005972 A1 | 1/2009 | de Koning |
| 2009/0012793 A1 | 1/2009 | Dao et al. |
| 2009/0176510 A1 | 7/2009 | Routtenberg |
| 2009/0207777 A1 | 8/2009 | Stamoulis et al. |
| 2009/0234655 A1 | 9/2009 | Kwon |
| 2009/0249432 A1 | 10/2009 | O'Sullivan et al. |
| 2009/0254667 A1 | 10/2009 | Li et al. |
| 2010/0003659 A1* | 1/2010 | Edmonds .................. G09B 7/04 434/350 |
| 2010/0009698 A1 | 1/2010 | Yang et al. |
| 2010/0054526 A1 | 3/2010 | Eckles |
| 2010/0070268 A1 | 3/2010 | Sung et al. |
| 2010/0088749 A1 | 4/2010 | Steeples |
| 2010/0094707 A1 | 4/2010 | Freer |
| 2010/0113062 A1* | 5/2010 | Lee ....................... G01S 5/0045 455/456.1 |
| 2010/0266994 A1 | 10/2010 | Gregoire et al. |
| 2010/0321465 A1 | 12/2010 | Behrens |
| 2010/0325207 A1 | 12/2010 | Churchill et al. |
| 2011/0022642 A1 | 1/2011 | Demilo et al. |
| 2011/0055207 A1 | 3/2011 | Schorzman et al. |
| 2011/0072154 A1 | 3/2011 | Bogdanovic et al. |
| 2011/0077989 A1* | 3/2011 | Akred .................... G06Q 10/06 705/7.38 |
| 2011/0093818 A1 | 4/2011 | Sathish |
| 2011/0171935 A1 | 7/2011 | Kamal |
| 2011/0173041 A1 | 7/2011 | Breitenbach et al. |
| 2011/0179180 A1 | 7/2011 | Schleifer et al. |
| 2011/0201356 A1 | 8/2011 | George et al. |
| 2011/0202466 A1 | 8/2011 | Carter |
| 2011/0205053 A1 | 8/2011 | Chen et al. |
| 2011/0237217 A1 | 9/2011 | Monks et al. |
| 2011/0255680 A1 | 10/2011 | Vuong |
| 2012/0034590 A1 | 2/2012 | Hallsten et al. |
| 2012/0071129 A1 | 3/2012 | Haney |
| 2012/0089617 A1 | 4/2012 | Frey |
| 2012/0123890 A1 | 5/2012 | Nathan |
| 2012/0130651 A1 | 5/2012 | Papadimitriou et al. |
| 2012/0151380 A1 | 6/2012 | Bishop |
| 2012/0195234 A1 | 8/2012 | Cai et al. |
| 2012/0226757 A1* | 9/2012 | McFarland ........... H04W 4/023 709/206 |
| 2012/0258437 A1 | 10/2012 | Sadeh-Koniecpol et al. |
| 2012/0310980 A1* | 12/2012 | Hepper .................. G06F 16/957 707/E17.014 |
| 2013/0040600 A1 | 2/2013 | Reitnour et al. |
| 2013/0060568 A1 | 3/2013 | Russell et al. |
| 2013/0073388 A1 | 3/2013 | Heath |
| 2013/0117824 A1 | 5/2013 | Naslund et al. |
| 2013/0130207 A1 | 5/2013 | Russell et al. |
| 2013/0196706 A1 | 8/2013 | Patel et al. |
| 2013/0196906 A1 | 8/2013 | Eliasof |
| 2013/0204972 A1 | 8/2013 | Russell et al. |
| 2013/0204998 A1 | 8/2013 | Russell et al. |
| 2013/0317944 A1 | 11/2013 | Huang et al. |
| 2014/0026094 A1 | 1/2014 | Zimmerman et al. |
| 2014/0052676 A1 | 2/2014 | Wagner et al. |
| 2014/0143354 A1 | 5/2014 | Tiernan |
| 2014/0148210 A1 | 5/2014 | Kundu et al. |
| 2014/0214979 A1 | 7/2014 | Turakhia |
| 2014/0279238 A1 | 9/2014 | Jones et al. |
| 2014/0316779 A1 | 10/2014 | Russell et al. |
| 2014/0316898 A1 | 10/2014 | Russell et al. |
| 2015/0065149 A1 | 3/2015 | Russell et al. |
| 2015/0100433 A1 | 4/2015 | Choy et al. |
| 2015/0105061 A1 | 4/2015 | Russell et al. |
| 2015/0106167 A1 | 4/2015 | Russell et al. |
| 2015/0113098 A1 | 4/2015 | Vanbuskirk et al. |
| 2015/0213382 A1 | 7/2015 | Russell et al. |
| 2015/0256873 A1 | 9/2015 | Klein et al. |
| 2015/0269700 A1 | 9/2015 | Miasnik et al. |
| 2015/0269869 A1 | 9/2015 | Russell et al. |
| 2015/0304417 A1 | 10/2015 | Tan |
| 2015/0310536 A1 | 10/2015 | Brady et al. |
| 2016/0012471 A1 | 1/2016 | Fisher et al. |
| 2016/0014583 A1 | 1/2016 | Thomaschima et al. |
| 2016/0148300 A1 | 5/2016 | Carr et al. |
| 2016/0171432 A1 | 6/2016 | Pugh et al. |
| 2016/0225045 A1 | 8/2016 | Cumberland et al. |
| 2016/0321595 A1 | 11/2016 | Russell et al. |
| 2016/0321596 A1 | 11/2016 | Russell et al. |
| 2016/0321611 A1 | 11/2016 | Russell et al. |
| 2016/0323181 A1 | 11/2016 | Russell et al. |
| 2016/0364790 A1 | 12/2016 | Lanpher et al. |
| 2017/0011449 A1 | 1/2017 | Mueller et al. |
| 2017/0024804 A1 | 1/2017 | Tepfenhart et al. |
| 2017/0039512 A1 | 2/2017 | Jones et al. |
| 2017/0083848 A1* | 3/2017 | Edelman ............ G06Q 30/0252 |
| 2017/0091837 A1 | 3/2017 | Russell et al. |
| 2017/0093952 A1 | 3/2017 | Kumar et al. |
| 2017/0187826 A1 | 6/2017 | Russell et al. |
| 2017/0213178 A1 | 7/2017 | Todd et al. |
| 2018/0013698 A1 | 1/2018 | Vendrow et al. |
| 2018/0144356 A1 | 5/2018 | Holman et al. |
| 2018/0189844 A1 | 7/2018 | Russell et al. |
| 2018/0191817 A1* | 7/2018 | Richardson ......... H04L 61/4511 |
| 2018/0260758 A1 | 9/2018 | Russell et al. |
| 2018/0375810 A1 | 12/2018 | Kumar et al. |
| 2019/0130336 A1 | 5/2019 | Todd et al. |
| 2019/0156688 A1 | 5/2019 | Russell et al. |
| 2019/0207894 A1 | 7/2019 | Kumar et al. |
| 2019/0311409 A1 | 10/2019 | Russell et al. |
| 2019/0349412 A1 | 11/2019 | Vanbuskirk et al. |
| 2020/0153729 A1 | 5/2020 | Vanbuskirk et al. |
| 2020/0175454 A1 | 6/2020 | Todd et al. |
| 2020/0195750 A1 | 6/2020 | Russell et al. |
| 2020/0210927 A1 | 7/2020 | Russell et al. |
| 2020/0302493 A1 | 9/2020 | Russell et al. |
| 2021/0006610 A1 | 1/2021 | Vanbuskirk et al. |
| 2021/0289042 A1 | 9/2021 | Vanbuskirk et al. |
| 2021/0334730 A1 | 10/2021 | Todd et al. |
| 2021/0334731 A1 | 10/2021 | Todd et al. |
| 2021/0334732 A1 | 10/2021 | Vanbuskirk et al. |
| 2021/0399981 A1 | 12/2021 | Vanbuskirk et al. |
| 2022/0108259 A1 | 4/2022 | Vanbuskirk et al. |
| 2022/0172599 A1 | 6/2022 | Mehta et al. |
| 2022/0210209 A1 | 6/2022 | Vanbuskirk et al. |
| 2022/0374949 A1 | 11/2022 | Russell et al. |

OTHER PUBLICATIONS

"European Search Report, Application No. 14160323.3", Jun. 18, 2014, 6 pages.

"International Search Report, PCT/2012/025984", Dec. 22, 2012, 9 pages.

"What is Cloud Networking or Cloud Based Networking?", SDxCentral, www.sdxcentral.com/cloud/definitions/all-about-cloud-networking/, 2017, 2 pgs.

Arbanowski, "I-centric Communications: Personalization, Ambient Awareness and Adaptability for Future Mobile Services", IEEE Communications Magazine, Sep. 2004, 7 pages.

Rao, "Geographic Routing without Location Information", 9th Annual International Conference on Mobile Computing and Networking, Sep. 2003, 13 pages.

* cited by examiner

CONTEXT AND CONTEXTUAL HISTORY WITHIN AN OBSERVATION PLATFORM ENVIRONMENT

CROSS-REFERENCE TO RELATED U.S. APPLICATIONS—CONTINUATION

This application is a continuation of and claims the benefit of patent application Ser. No. 17/676,191 (now issued U.S. Pat. No. 11,797,904), entitled "OBSERVATION PLATFORM METRICS FOR USERS WITHIN AN OBSERVATION PLATFORM ENVIRONMENT," by Christopher N. Todd et al., with filing date Feb. 20, 2022, which is herein incorporated by reference in its entirety.

Application Ser. No. 17/676,191 is a continuation of and claims the benefit of then patent application Ser. No. 16/786,021 (now issued U.S. Pat. No. 11,257,021), entitled "OBSERVATION PLATFORM USING STRUCTURED COMMUNICATIONS FOR GATHERING AND REPORTING EMPLOYEE PERFORMANCE INFORMATION," by Christopher N. Todd et al., with filing date Feb. 10, 2020, which is herein incorporated by reference in its entirety.

Application Ser. No. 16/786,021 is a continuation of and claims the benefit of then patent application Ser. No. 16/195,555 (now issued U.S. Pat. No. 10,558,938), entitled "OBSERVATION PLATFORM USING STRUCTURED COMMUNICATIONS FOR GATHERING AND REPORTING EMPLOYEE PERFORMANCE INFORMATION," by Christopher N. Todd et al., with filing date Nov. 19, 2018, which is herein incorporated by reference in its entirety.

Application Ser. No. 16/195,555 is a continuation of and claims the benefit of the then patent application Ser. No. 15/470,235 (now issued U.S. Pat. No. 10,134,001), entitled "OBSERVATION PLATFORM USING STRUCTURED COMMUNICATIONS FOR GATHERING AND REPORTING EMPLOYEE PERFORMANCE INFORMATION," by Christopher N. Todd et al., with filing date Mar. 27, 2017, which is herein incorporated by reference in its entirety.

Application Ser. No. 15/470,235 claims priority to the then provisional patent application, Ser. No. 62/314,106, entitled "OBSERVATION PLATFORM USING STRUCTURED COMMUNICATIONS FOR GENERATING, REPORTING AND CREATING A SHARED EMPLOYEE PERFORMANCE LIBRARY," with filing date Mar. 28, 2016, which is herein incorporated by reference in its entirety.

Application Ser. No. 15/470,235 is a continuation-in-part application of and claims the benefit of the then patent application Ser. No. 14/869,167 (now issued U.S. Pat. No. 10,069,781), entitled "OBSERVATION PLATFORM USING STRUCTURED COMMUNICATIONS WITH EXTERNAL DEVICES AND SYSTEMS," with filing date Sep. 29, 2015, which is herein incorporated by reference in its entirety.

Application Ser. No. 15/470,235 is a continuation-in-part application of and claims the benefit of then patent application Ser. No. 15/375,725 (now issued U.S. Pat. No. 9,928,529), entitled "OBSERVATION PLATFORM FOR PERFORMING STRUCTURED COMMUNICATIONS," with filing date Dec. 12, 2016, which is herein incorporated by reference in its entirety.

Application Ser. No. 15/375,725, is a continuation application of and claims the benefit of then patent application Ser. No. 14/320,356 (now issued U.S. Pat. No. 9,542,695), entitled "OBSERVATION PLATFORM FOR PERFORMING STRUCTURED COMMUNICATIONS," with filing date Jun. 30, 2014, which is herein incorporated by reference in its entirety.

The application with Ser. No. 14/320,356 is a continuation-in-part application of and claims the benefit of then patent application Ser. No. 13/401,146 (now issued U.S. Pat. No. 8,948,730), entitled "OBSERVATION PLATFORM FOR USING STRUCTURED COMMUNICATIONS," with filing date Feb. 21, 2012, which is herein incorporated by reference in its entirety.

The application with Ser. No. 13/401,146 claims priority to the provisional patent application, Ser. No. 61/445,504, entitled "ENABLING A RETAIL SALES/SERVICE PROVIDER TO INTERACT WITH ON-PREMISE CUSTOMERS," with filing date Feb. 22, 2011, which is herein incorporated by reference in its entirety.

The application with Ser. No. 13/401,146 also claims priority to the provisional patent application, Ser. No. 61/487,432, entitled "ACTIVITY COORDINATING ASSOCIATE'S AUTOMATIC SERVICE ASSISTANT," with filing date May 18, 2011, which is herein incorporated by reference in its entirety.

The application with Ser. No. 14/320,356 is a continuation-in-part application of and claims the benefit of then patent application Ser. No. 13/665,527 (now abandoned), entitled "AUDIBLE COMMUNICATIONS FOR QUERIES WITH INFORMATION INDICATIVE OF GEOGRAPHIC POSITION," with filing date Oct. 31, 2012, which is herein incorporated by reference in its entirety.

The application with Ser. No. 15/375,725, is also a continuation-in-part application of and claims the benefit of patent application Ser. No. 13/665,527 (now abandoned), entitled "OBSERVATION PLATFORM FOR PERFORMING STRUCTURED COMMUNICATIONS," with filing date Oct. 31, 2012.

BACKGROUND

Modern communication devices provide for many communication and business analytics opportunities in retail, hospitality, industrial, enterprise and other settings. Many communication devices have multiple functions and have wireless connectivity options. Additionally, many different types of devices, systems, and/or objects may be networked together including devices with electronics, software, sensors, beacons, smartphones and Internet-of-Things (IoT) devices; thereby enabling data to be exchanged between devices and statistically gathered over the network. Given the present communications devices and the present network connectivity, the data gathered can be quantified, organized, and analyzed to represent an objective, numerical, performance profile for an individual user of the system.

The present technology describes how an observation platform can be used to integrate multiple devices or external systems, and how information that traverses the observation platform can contain valuable statistical information which can be manipulated, analyzed and classified through computer algorithms using the context of users and devices, combined with the policy of the enterprise or the default observation platform policy, to yield higher level metrics that indicate the efficiency, effectiveness and performance of individuals engaged in the use of the observation platform.

BRIEF DESCRIPTION OF THE DRAWINGS AND TABLES

DESCRIPTION OF EMBODIMENTS

Figure 1:
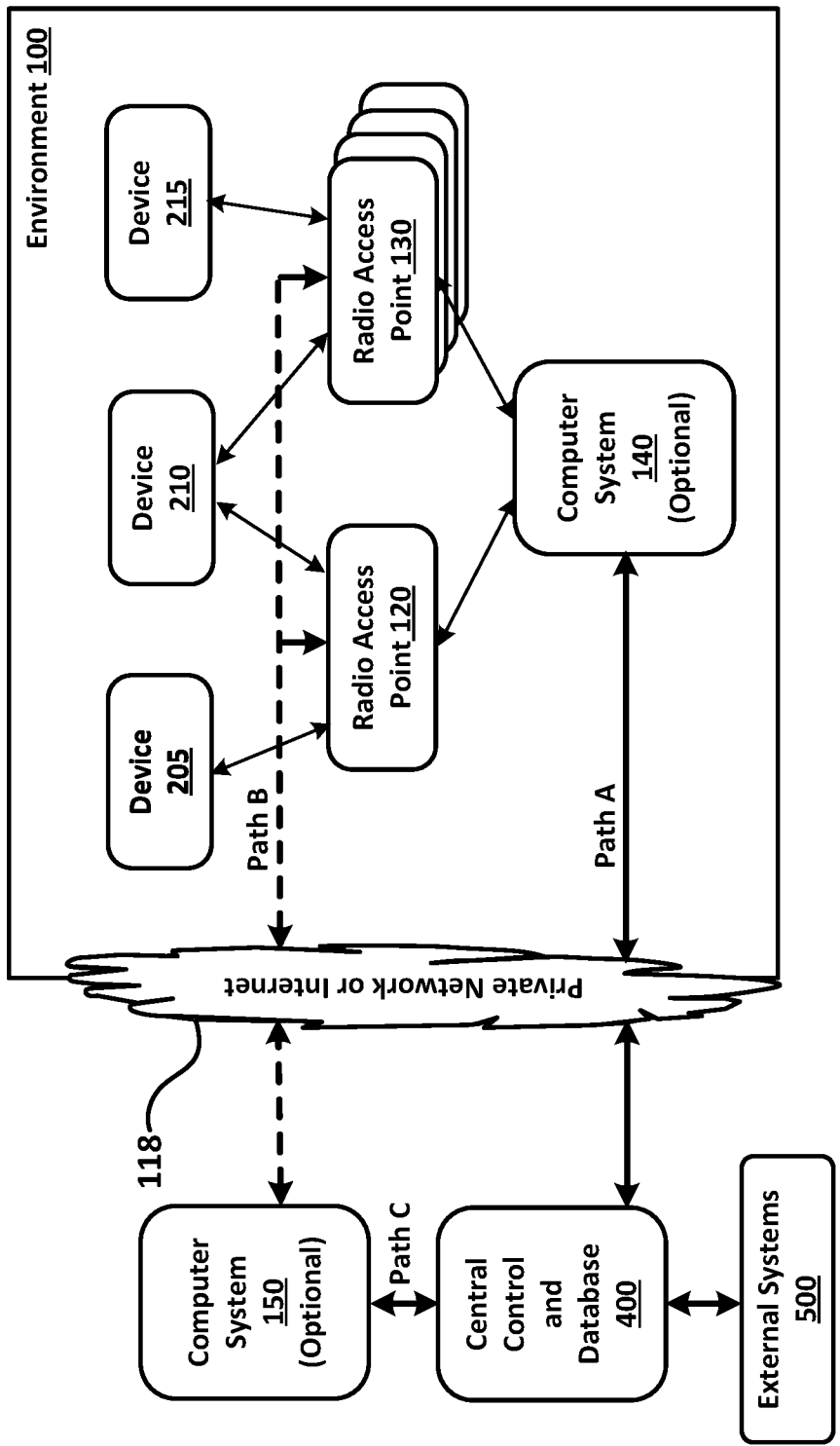
FIG. 1 is a flowchart of an overview of the observation platform, in accordance with an embodiment.

Reference will now be made in detail to embodiments of the present technology, examples of which are illustrated in the accompanying drawings. While the technology will be described in conjunction with various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present description of embodiments, discussions utilizing terms such as "receiving," "recognizing," "deriving," "storing," "relaying," "executing," "generating," "determining," "tracking," "recording," "identifying," "locating," "making," "delivering," "scheduling," "specifying," "translating," or the like, refer to the actions and processes of a computer system, or similar electronic computing device. The computer system or similar electronic computing device, such as a wearable computer, telephone, smart phone, tablet computer, handheld mobile device, or other connected IoT device manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer system technologies such as, for example, optical, quantum and mechanical computers.

A user or users, as referred to herein, may be a person or people such as, sales associates, employees, managers, trainees, trainers, doctors, clinicians, patients, customers, emergency responders, personnel, etc. In one embodiment, the user interfaces with a device for communications with other users or interaction with external systems. Such a device may be a handheld device, a headset, a smartphone, a tablet, an earpiece, a radio, a computer system, or other device capable of providing communications across the network. Such users may be part of the enterprise operating the observation platform or they may be external to the operating entity (e.g., customers, shoppers or visitors) and desire access to users, information or control of devices within the attached data network.

Customers or visitors may refer to anyone within the environment of an observation platform who are not directly connected to the observation platform system but may do so by using the wearable devices or other applications (apps) designed to connect by permission and arrangement directly with the observation platform. In one embodiment, customers or visitors may refer to individuals who are purchasing or shopping for items or services in store or hospitality environment, past customers, potential customers, perspective customers, shoppers, browsers, or others who enter the store environment as a potential client and not with the same operational access an employee does.

Overview of Observation Platform Using Structured Communications with External Devices and Systems Overview of the Observation Platform The present technology employs an observation platform for structured communications and for gathering or collecting statistics about the users, devices and external systems that may connect to the observation platform. The following overview describes how an observation platform is used for communications between devices and computer systems and is used for collecting statistics from devices, communications and computer systems. Individual details, embodiments, and components of the observation platform described herein may or may not be used for embodiments pertaining to using observation platform to measure and quantify user performance scores, grades, benchmarks or rankings.

Using structured communications in an observation platform, as referred to herein, may refer to the following actions regarding communications between two or more users or one user and one or more computer systems: mediating, disciplining, structuring, controlling, participating, discouraging, encouraging, influencing, nudging, making an example of, permitting, limiting, managing, validating for compliance with policies, measuring what goes on as a communication occurs, characterizing, enabling, observing, recording, correcting, directing, informing, requesting, alerting, etc.

Embodiments of the present technology are for an observation platform using structured communications including communication with external devices and systems. An observation platform may involve a number of users and provides structured and disciplined communications for the users and associated devices as well as captures data regarding the communications such as user context and performance metrics. The present technology may be employed in various environments such as retail settings, public-stage floors, outdoor venues, concerts, police scenarios, disaster areas, schools, sporting events, hospitality operations, hospitals, clinics, security operations, military operations, a prison organization, customer service centers, call centers, manufacturing organizations, a factory floor, warehouse operations and other environments where humans work together, with external computer systems or other IoT devices and where communications occur between users and/or the external systems or devices.

The mediating, structuring or disciplining process envisioned herein involves using a communications and computer system as a platform to receive communications or instructions from users, devices, external devices, IoT devices and computer systems; to generate or parse metadata related to the communication or instruction; and to relay, forward, delay or inhibit the communication or instruction based on the context (metadata) of each user, device or system.

Communications are enabled by multiple means including: simply speaking commands, saying names, asking questions, issuing commands, press-to-talk broadcasting to groups or segments of the observation platform, talking to specific groups or locations; listening to pre-established information (e.g., podcasts, messages, announcements, huddles, chat-ins or enterprise related info-casts), by users moving into locations where information is presented or requested based on location and context of the user or proximal device, listening to information from other users on the system either real-time or delayed, listening to information from other systems or processes within this system related to actions required or information necessary to work more efficiently.

The system, including other users, may prompt users for verbal contributions to the data store or seek selected button presses to determine further context or supplemental information and actions of the user. In conjunction with the communications and signaling information being exchanged, the system collects other relevant data which may include signals or sounds useful for location determination; sounds useful for system optimization; sounds useful for user identification, role determination, or environment detection; or other signal information (audible, sub-audible or optical) relevant to operating in the desired environment.

With reference now to FIG. 1, a flowchart of an overview of the observation platform is shown in accordance with an embodiment.

Environment 100 describes a physical location of a basic observation platform. Within environment 100 are communication devices 205, 210, 215 which represent one or a plethora of communication devices. These communication devices communicate using wireless signals connecting to Radio Access Points within the Environment 100. These communication devices may be owned by the enterprise, owned by the user, or owned by the observation platform provider and may include, for example, a smartphone, a tablet computer, or a wearable device.

Devices 205, 210 and 215 may be user devices that are mobile and employed by a user to communicate with other users via other devices. Communications between the devices may be described as signals. The devices 205, 210 and 215 may be a smartphone, a personal digital assistant, a fob, a handheld device, a headset device or other small electronic device. In one embodiment, devices 205, 210 and 215 employ speakers and microphones with control buttons for audible communications. The control buttons may be press to signal buttons, push to talk buttons, volume control buttons, and power on/off buttons or other standard buttons and may be options on a touchscreen. Devices 205, 210 and 215 may be handheld, may be worn around the neck, and may be a headset worn on the head or behind the ear or otherwise interface with the human body. Devices 205, 210 and 215 may or may not comprise a screen or display such as a liquid crystal display (LCD). In one embodiment, devices 205, 210 and 215 do not comprise a display such that a user is not inundated with too many options or too much information from the device. A user device without a display may simplify communications and thus allow heads-up awareness and presence in the environment. Another user, such as a customer, may be more likely to employ the device for its intended purpose if the human interface is simplified.

Devices 205, 210 and 215 and other devices in environment 100 may be dispensed to a user upon entering environment 100 or may be brought by the user into environment 100. For example, in a retail setting associates may be issued devices by the employer or owner of the retailer setting. Customers in the retail setting may also be issued devices as they enter the retail setting. Customers may choose whether or not to accept the device or whether or not to use the device after accepting it. The associate devices and the customer devices may or may not be the same type or model of devices. Alternatively, the customer may bring a device into the retail setting such as a smartphone. The customer may download an app to the smartphone that will allow the customer to use the device for communications in the store with associates or others in accordance with present technology. The customer may remain anonymous or may elect to identify themselves. In one embodiment, recognition of the customer's identity is not required for additional services or offers.

There may be multiple radio access points (shown for example as 120 and 130) and access point technology may include Wi-Fi, Bluetooth, private radio or other wireless connections. An environment and may contain a single or a plethora of radio access points as shown. In one instance, computer system 140 exists within Environment 100, and by using standard computer networking technologies such as switches, bridges, routers, firewalls, gateways, etc., the radio access points communicate with each other and with computer system 140. Computer system 140 communicates via standard networking technologies, possibly including the Internet 118, to the central control and database 400 using bi-directional Path A. Computer system 140 is optional in the physical location of environment 100.

If the computer system 140 is not included in environment 100, Path B is used to communicate between the radio access points (120, 215, etc.) and an external computer system 150, which may reside in the cloud, in the enterprise, or at the service provider for the observation platform. Environment 100 must either contain computer system 140 or be connected to computer system 150 in order to operate. It is possible to configure an observation platform with both computer system 140 and computer system 150 connected for purposes of redundancy.

Access points 120, 130 and devices 205, 210, 215 employ standard techniques for communicating wirelessly. The communications may be performed using radio techniques such as near field communications, short wave radio, infrared, Bluetooth, Wi-Fi, standard wireless computer network protocols, etc. Devices 205, 210 and 215 may be able to communicate with each other directly or through access points 120 and 130. Devices 205, 210 and 215 communicate with each other via the computer system 140 or 150. In one embodiment, all communications in environment 100 are relayed through the access points which act as a central hub. For example, device 205 may communicate with device 210 by device 205 sending a communication to access point 120, computer system 140 derives that device 210 is the destination for the communication and relays the communication to device 210. This may occur automatically and quickly enough such that the users will not experience any undue lag in communications. In one embodiment, devices 205, 210 and 215 may communicate directly with computer 140. For example, a user may issue a command to computer 140 via device 205 or computer 140 may send information to device 205. Information send from computer 140 to device 205 may be an audible voice signal or may be textual, contextual, geographical or graphical data to be displayed at device 205 if it is properly equipped to do so.

Computer systems 140 or 150 are responsible for the structuring of communication and collection of analytical data from the devices (205, 210, 215, etc.). Computer system 140 or computer system 150 report data to the central control and database 400 using either Path A or Path C as indicated. Additionally, the central control and database 400 provides information, instructions, messages, configuration data and policy information to computer system 140 or computer system 150 for structuring and controlling the communication flow to and among the Devices within Environment 100. Central control and database 400 contains the instructions for policy distribution to computer system 140 or computer system 150. Central control and database 400 accumulates the primary statistics and processes the algorithms for generating the secondary statistics and higher-order statistics used to determine system health and user performance.

The central control and database 400 may reside with the provider of the observation platform, in the cloud, within the enterprise or in a commercially available server farm facility. Central control and database 400 provides one or more application programming interfaces (APIs) to any external systems 500 and information sources that may communicate with the users and devices within environment 100. The central control and database 400 also provides encrypted and secure storage and access to computer systems 140 or 150.

External systems 500 may refer to external computer systems owned by the enterprise, third-party services, vendors or suppliers, or the provider of the observation platform. These external systems may contain information that is pushed to users of the observation platform such as time-clock alerts, video analysis alerts, cross-channel or omni-channel support alerts, enterprise-wide or group-targeted messaging text or audio, automated status alerts or other information that would be useful to one or more users of the observation platform(s).

Figure 2:
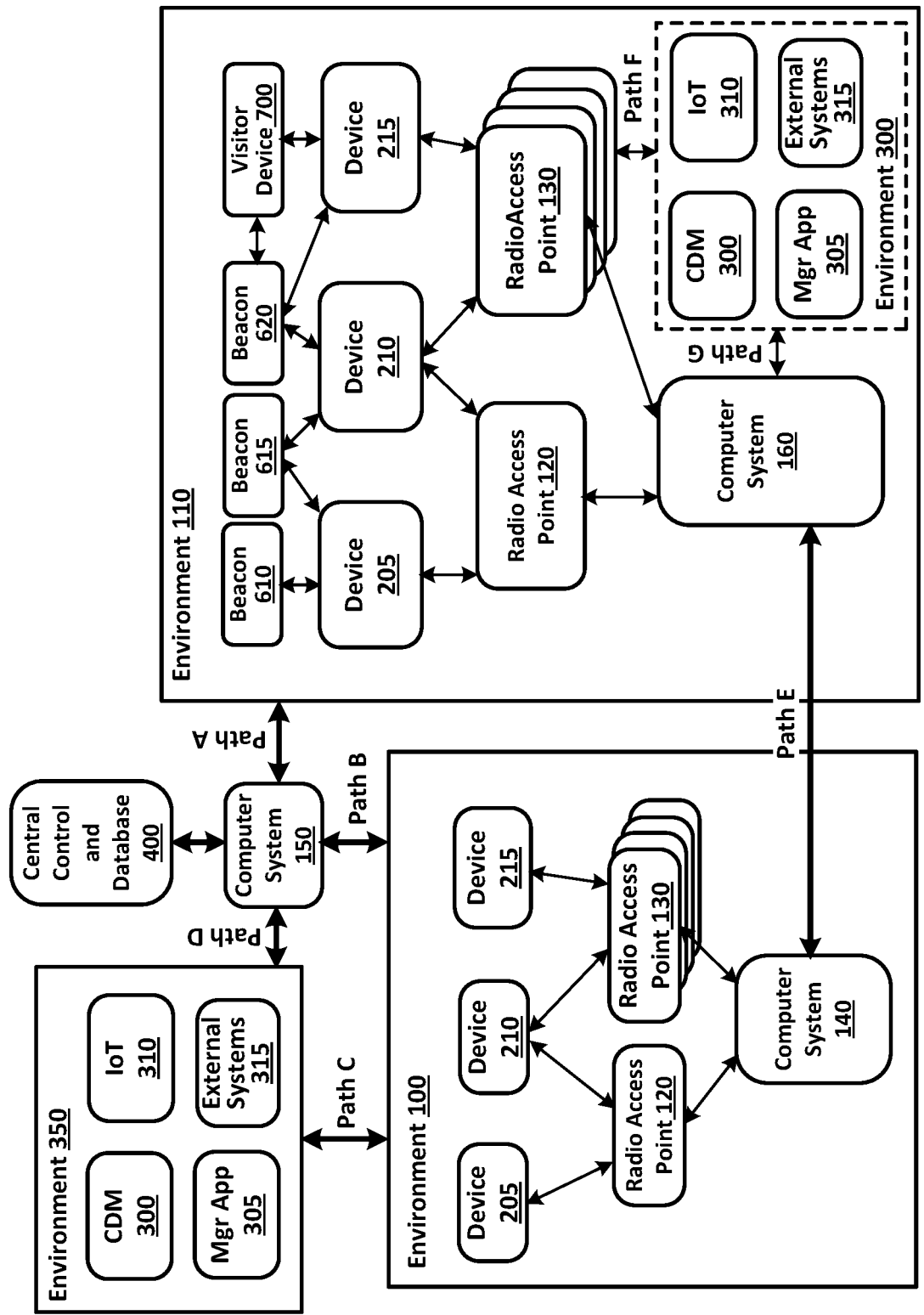
FIG. 2 is a flow diagram illustrating the connections between observation platforms and to external devices, IoT, beacons and external systems, in accordance with one embodiment.

With reference now to FIG. 2, a flow diagram illustrating the connections between observation platforms and to external devices, internet of things (IoT), beacons and external systems is shown in accordance with one embodiment.

FIG. 2 uses the basic observation platform described in FIG. 1 and extends the overall system by: adding interconnections between other observation platforms; including within the observation platform a new environment 300 that contains one or more systems or alternate devices (series 300) that may interact with the devices (series 200) and hence users of the system; and attaching to the observation platform a new environment 350 that contains one or more systems or alternate devices (series 300) that may interact with the user devices (series 200) and hence users of the system.

Interconnection of observation platforms allows information to be exchanged and structured across any set of locations, buildings, cities or countries. The observation platforms, depicted in environments 100 and 110, are usually connected under the control of computer system 150 via Path A and Path B. Computer system 150 mediates the communication between the sites, applies policy to the transiting information, and extracts statistical information for application to Secondary or Higher-order statistics used for performance evaluation of users or the system integrity.

Environment 110 shows in greater detail how other devices within the observation platform environment can interact with user devices 205, 210 and 215, the radio access points 120 and 130, and the computer system 150 or 160.

Beacon devices 610, 615 and 620 are typically small fixed or mobile devices that emit a signal to alert other devices that they are within a near proximity of the beacon. The beacon signal may contain identification information or other information useful to the receiving device. For example, visitor device 700 may detect beacon 620 which causes visitor device 700 to contact a separate system to receive special offers or information regarding the local proximity. User devices 205, 210 and 215 may be capable of receiving the beacon signal which may be used for proximity detection and location determination. Additionally, user devices 205, 210 and 215 may be capable of transmitting a beacon signal to trigger actions in devices carried by visitors or shoppers.

For example, visitor device 700 may detect a beacon signal from device 215 which causes visitor device 700 to contact a separate system that in turn alerts the user of device 215 that they are in proximity to a specific visitor or shopper along with information about that visitor or shopper. The observation platform might then communicate with an external system (e.g., external system 315) to receive instructions and potential offers for that visitor or shopper.

Environment 300 depicts a set of other possible devices that may reside either within the observation platform as shown in environment 110, or external to the observation platform environment as shown with environment 100 which is connected with path C.

In one embodiment, content distribution manager browser 300 (CDM) is a software application that is accessed via a uniform resource locator (URL) by any computing device that employs a web browser. Content distribution manager browser 300 may comprise an application program interface (API) or graphical interface that is employed by a user of content distribution manager browser 300. A user of content distribution manager browser 300 may be required to provide authentication to access content distribution manager browser 300.

Content distribution manager browser 300 is employed by a user to manage and control messages that are sent to a plurality of observation platform and the devices therein. In one embodiment, content distribution manager browser 300 can retrieve content for a message or can be employed to generate new and original content for a message. In one embodiment, the content is an audio file such as a WAV file that is the recording of an audible voice such that when the message is delivered to and accessed by a destination device, the message will playback the audible voice. The content distribution manager browser 300 may be employed by a manager to record a voice message which is then delivered to a plurality of devices.

In one embodiment, a message controlled by content distribution manager browser 300 is delivered to a plurality of devices simultaneously. This may be accomplished by content distribution manager browser 300 sending out the message to the various devices at the same time, or content distribution manager browser 300 may deliver the message to a plurality of observation platforms with commands or instructions to deliver the message to specified devices within the observation platform at a designated time. Delivering the messages to the devices may also be described as pushing the message.

The manager using the content distribution manager browser 300 may designate the time a message should be available for the users and how long that message should be available to hear (end time). Alternatively, the content distribution manager browser 300 may be employed to deliver the same message to different devices at different times. For example, the message may be delivered to store managers within a set of observation platforms at a designated time before the message is delivered to other employees within the same set of observation platforms. The user of content distribution manager browser 300 may also specify that additional content or messages are sent to different devices. For example, additional content may be sent to store managers or additional content may be sent to devices associated with a specific department in a retail setting such as the painting department.

In one embodiment, content distribution manager browser 300 is employed to specify who or what devices are to receive the message with its content. For example, the user of content distribution manager browser 300 may have authority over several different environments each with its own observation platform. The user may wish that the message only be sent to specified observation platforms within the plurality of observation platforms. Alternatively, the user may specify that all of the devices within all of the observation platforms receive the message, or only devices located within the physical boundaries of the observation platform at the designated time receive the message, or only devices associated with a specific department receive the message or only devices associated with store employees and not customers receive the message. The possible options for specifying which devices receive a message and when are limitless.

A message may also be generated and sent to a specific individual. In one embodiment, content distribution manager browser 300 uses groupings by role, department, district, and/or region to determine which devices play a given message. It should be appreciated that the content of the message may be a voice recording, but may also be other content such as text, images, or video. In one embodiment, the message is sent to a given device with a command to notify the user of the device that there is a message received. The notification may be a light, a blinking light, a specific color of light, a sound, a textual notification, or any other type of notification that the device is capable of providing.

Content distribution manager browser 300 may be employed by a user that has high level access to the plurality of observation platforms. For example, a corporation may have hundreds or thousands of hospitality locations or store fronts that each makes use of an observation platform. The corporation may have a headquarters or central office with employees who have access to content distribution manager browser 300 with the ability and authority to send a message to anyone and everyone associated with the corporation.

In one embodiment, a device that receives a message from content distribution manager browser 300 automatically sends a confirmation back to content distribution manager browser 300 that the message has been received. Additionally, once the message has been accessed or heard by the user of the device, the device may send a message back to content distribution manager browser 300 that the messaged has been heard or otherwise accessed. In one embodiment, the message may be a mandatory message that the user of the device is required to access a, listen to and then acknowledge hearing. For example, process 1200 herein describes various embodiments of mandatory messages and consequences, rules or policies associated with mandatory messages.

Another possible element of environment 300 is the manager application, 305. In one embodiment, manager application 305 a software application or app that is accessed via a mobile computer system such as a smartphone or tablet. In one embodiment, the mobile computer system executes an Android operating system. In one embodiment, the mobile computer system executes an iOS operating system. Other operating systems may also be employed. Manager application 305 may be an app available for download and installation on the mobile computer system.

The manager application 305 is designed with an API or graphical interface specific to a mobile computer system such as a smart phone and to be used in the field by a user or manager associated with at least one observation platform. The user of manager application 305 may be a regional manager that has access to a plurality of observation platforms. The regional manager may regularly travel between the physical locations of the plurality of observation platforms and needs to have access to the observation platforms while physically remote and in the field on the go.

In one embodiment, manager application 305 allows the user of manager application 305 to communicate with or monitor any device or plurality of devices within any of the observation platforms associated with the user. Manager application 305 also is able to report statistics or observe or monitor communications with any of the observation platforms associated with the user. For example, the manager application 305 may be able to listen in to communications happening in real time within an observation platform or may be able to play back past recorded communications.

In one embodiment, the manager application may operate in a manner identical to the mobile devices in the observation platform as a peer-like device. In this mode the manager application may broadcast or direct communications to specific devices, receive alerts and provide both a primary signal for communication and a secondary signal for determining geographic location. In one embodiment, the peer-like device may be able to operate and interact with devices within an observation platform without directly communicating with a central computer system. In other words, the central computer system may or may not be required for receiving and relaying messages from the manager application.

The manager application 305 may also be employed to send announcements or messages similar to content distribution manager browser 300. The manager application 305 may communicate directly through a network with a given observation platform or may use the external communications path D, path A and path B.

Another possible element of environment 300 is an IoT device. An observation platform may be associated with external devices including a growing list of electronic devices that communicate with each other or with one or more systems providing status, alerts and other useful command/control information. These external devices are able to operate in an observation platform and communicate using formatted data strings and standard internet protocols for communication across the Internet. These external devices may be referred to as the IoT.

Specifically, external devices and systems 310 depicts a wide array of IoT devices that can use the observation platform for alerting selected users of actions needed or that may query selected users for additional information or may query the observation platform for user contextual information or may allow users to instruct or control the IoT devices based on user context and policy. Environment 300 comprises components that may or may not be used with different embodiments of the present technology and should not be construed to limit the present technology.

The present technology provides for many examples of how structuring communications may be used in various environments for a variety of purposes. The following discussion will demonstrate various hardware, software, and firmware components that are used with and in computer systems and other user devices for structuring communications using various embodiments of the present technology. Furthermore, the systems, platforms, and methods may include some, all, or none of the hardware, software, and firmware components discussed below.

One purpose of structuring or disciplining a communication is for users to become more productive and more effective customer service associates or sales people in a retail or hospitality setting. The present technology may accomplish this goal by monitoring communications of the users that occur via communication devices. The communications may be monitored to derive context information from the communication such as the name of the user; geographic location of a user; the state or status of the user (e.g., busy, available, engaged, conversing, listening, out-of-range, not logged on, etc.); the user's interaction with others; proximity to other users, visitors, beacons, cellular phones or other electronic signals; commands or instructions from the user to external devices; instructions or requests from external devices to the user; how the user responds, both physically and verbally, to those instructions or requests.

An observation platform may be associated with external devices including a growing list of electronic devices that communicate with each other or with one or more systems providing status, alerts and other useful command/control information. These external devices are able to operate in an observation platform environment and communicate using formatted data strings and protocols for communication using the Application Programming Interface (API) for the observation platform. These external devices form a diverse group of equipment that may be referred to as the IoT. Other devices within the observation platform may use radio techniques such as Bluetooth or Bluetooth Low Energy (BLE) to signal their presence and information. These devices are sometimes called "beacons" and may be used for triggering actions on the wearables, smartphones or other devices carried on a person.

In one embodiment, the structured communications of the observation platform allows users to directly and immediately interact with external devices through the mechanisms of the observation platform such as: interpretation and recognition of spoken words (e.g., speech-to-text speech recognition), geographic location determination provided by the observation platform, proximity location provided by external cues (e.g., a beacon, environmental sounds, sub-audible sounds, RF signals or optical trigger) and optional identification of end users, their roles, assigned tasks, primary locations and individual responsibilities.

The external devices may collect and gather data via sensors such as cameras, motion sensors, heat sensors, door counters, proximity sensors, beacons, temperature sensors, etc. The collected data may be exchanged via a network such as the network associated with the observation platform or via separate connections or networks. Moreover, the observation platform may be able to make inferences from communications and locations within the observation platform as well as make inferences from the data gathered by the external devices. The inferences may then be combined with policy and used to structure the communications and/or structure the control or requests from the external devices or take other actions within the observation platform.

An observation platform is used to connect enterprise users with each other and connect the users with external devices and computer systems associated with the observation platform. Policy, as accepted or determined by the controlling enterprise, determines the most appropriate action for commands to other users or external devices, or requests from other users or external devices. The policy can use information such as, but not limited to: location, history, recognition of spoken words and optional personal identification including roles and responsibilities, plus any information provided by the external system, to dynamically determine and control how communications, commands, information or other requests and responses are routed through the system and presented to the users or external devices.

The users of the observation platform carry or wear devices capable of capturing the person's voice, surrounding information such as sounds and sub-audible sounds, electronic signals or optical signals. Sub-audible sounds may or may not be made by a human user but are sounds that are out of the range of normal human hearing. Electronic signals may be any radio (RF) device or beacon which emits a radio signal that is received by the user wearable device regardless whether the signal is demodulated or understood by the user device. The wearable device develops a second signal from the surrounding information which is used by the observation platform to determine the nature of the external device, the location of the device and indicative of the current context of the associated user. The device may be a commercially available device or, may be a specific purpose device built for the present technology normally using a button that is pressed to capture the user's voice when specific actions are desired by the user.

The communications, motions and behaviors of users within the observation platform may be monitored to derive context and user performance information from the raw statistics gathered by the system. Many raw statistics are used to dynamically determine source and, separately, destination context by the system and are selected from the group raw statistics such as: engagement time; available times; location maps for the enterprise layout; listen time and who or what was listened to; talking time on the system; non-system directed talking time as detected by the wearable; number and role of listeners to messages sent to the system; urgency of listeners to hear a message from the user; geographic location of devices and users; locations traversed including speed and direction; time in-zone and not-in-zone; who initiated communications to which individuals, groupings of individuals or external systems; type of communication (e.g., broadcast, private individual, private group, announcement, voice-to-machine, machine-to-user, initiate requests for actions, respond to requests for action etc.); length of communication; location of initiating communications; locations of receiving communications; intonation; speech pacing; lengths of speeches; lengths of speech segments; when, where, and for how long two or more users dwell in close proximity to each other or to specific locations; speed of movement and pausing of listening individuals during/after talking or listening to another user or a connected system; frequency that listeners delay hearing a message, drop out from what a speaker is saying, or delete a message before hearing it from a user; questions asked and how long the question takes to ask; questions answered, and how long it takes to respond and then answer the question; action requests initiated from users or external systems, action requests responded to from users or external systems, from where, to where and any associated motions; promptness of responses to what was heard from users or from external systems, button presses and button press durations as initiated by the user; which policies are invoked by the observation platform for the communications between users or external systems.

Context determination is the result of the analysis of the raw statistics within the observation platform and using the default or explicit policy of the enterprise to determine the most appropriate recipient of information from either users or external devices, or where and when to most appropriately deliver messages, communications, commands, requests or instructions to users or devices.

The structuring or disciplining process described herein involves using a communications and computer system as a platform to first, build a context and contextual history of each user or device based on actions, motions, instructions, reactions and behaviors within the observation platform, and second, use policy and inference to make determinations for distributing information, instructions or voice files; collecting information; generating requests for actions; accepting and playing requests for action; generating or distributing instructions or indicators from users or external systems; or delivering information, requests, instructions, indicators, a user's voice, or other audible messages to other users or other external systems.

For example, the observation platform may listen to commands from users, interpret those commands, establish two-party and multi-party communications links, pass on messages, and store messages and commands for later action. Commands from users, internal rules and policies, or external systems may indicate the need for specific assistance at specific locations and policy may determine how many and which users hear the request or which external systems are issued instructions. The interpretation of commands may also be relayed or forwarded to the external devices as instructions to that device or plurality of devices.

A response by a user or external system may be voluntary or mandatory, based on policy, and is processed by the observation platform using current context, historical context, inference and policy to determine the most appropriate actions. Data is collected about each step of the process thereby permitting an owner or manager or a group of people to observe and analyze the effectiveness of the group's interactions with each other and with external systems. Aggregating the data and employing analytical tools within the observation platform can result in performance information for each user of the system, groups of users, wearable device and external systems.

The communications may be monitored by a computer connected to the observation platform which is associated with a data network that acts as a conduit for the user communications, primary statistics, actions and reactions of users and devices. The data network may consist of, but is not limited to: wireless connections (typically, but not exclusively WiFi), wired connections, optical connections, switches, routers, firewalls, encryption devices, private networks, Internet segments, cloud-based segments and enterprise-owned servers.

The computer system may convert audible, voice or speech communications to text or machine-compatible format using standard and well-known speech recognition techniques. Decoding the spoken words may determine commands, identify keywords, and initiate actions based on the words spoken and the button that is pressed at the time of speaking. The decoded text in combination with location or proximity to other devices may be used to derive additional context information from the communication. The computer system may also store some or all of the communication including the audible portion of the communication, the context of the user, the decisions made by inference and policy, and the decoded text of the communication.

The computer system may also be in communication with the external systems, external devices or IoT devices and have the ability to issue instructions to the external devices or receive instructions from the external devices. Instructions may be requests for action, responses to instructions or information that is useful to the user or the connected system.

The structured communications may extend beyond a single venue to multiple venues or enterprise locations without regard to geographic spacing. A plethora of observations platforms may be connected via a network and will interoperate according to the programmed policy.

In one embodiment, the computer system uses the context information derived from the raw data combined with policy to determine a destination of the communication and forwards, delays, inhibits, modifies or relays the communication to the destination. For example, a first user may attempt to contact a second user via communication devices. The first user sends the communication to the computer system associated with the observation platform using the network. The computer system recognizes the first user's speech or instruction and is able to derive current context information to add to historical context information for determining that the communication's destination is a third user. The computer system then relays the communication, via the network, to a communication device associated with the third user. The computer system may also convert the communication to text and derive additional instructions or performance metrics regarding the first or third user. For example, the first user may be an associate in a retail setting and the third user is a customer. The first user may be responding to a query made by the third user. The performance metric may be the length of time it took for the first user to respond to the query, how long it took to respond to the query, whether or not the query was satisfied, the geographic location of the first user, the geographic location of the third user, the proximity between the users, or may be a different metric entirely. The computer system may derive and store more than one performance metric for each communication exchange.

In one embodiment, the computer system generates or parses metadata related to a communication and also knows metadata for each of a plurality of devices in the observation platform. The computer system is then able to match an attribute of the metadata from the communication to an attribute from the metadata of at least one of the plurality of devices in the observation platform. The communication may then be forwarded to the matched device(s). The metadata may be described as attributes, tags, or characteristics of a communication. The communication may be a signal generated by user device and may comprise speech, text, audio, video, button-press instructions, or a combination thereof.

The attributes of the metadata may not be associated with the content of the signal and are related to context of the signal such as the time the signal was sent, an identification of the device that sent the signal, a location of the device when the signal sent, a geographic zone the device is located in, history of the device sending communication, etc. In one embodiment, the metadata is associated with the content of the signal, such as text. The generating of metadata and relaying of the communication may occur substantially in real time such that a user of the device does not perceive any delay in communications.

In one embodiment, the computer system is able to determine geographic locations of users based on information received from communication devices associated with the users. The geographic location data may be stored as data associated with a user's communications device at a particular time, or as a performance metric, or may be combined with other information to generate a performance metric. The location data is an element of the context of the user or external device and is used by the observation platform for structuring the flow of all information. Geographic information and user motion combined become elements of the user context and are used with policy to determine the source or destination of information processed by the observation platform.

Observation Platform Using Structured Communications for Determining Personal Performance Metrics Definitions Primary Statistics: Those numerical observations that can be obtained by the observation platform from direct use of any and all of its communication-mediating, location-sensing powers and context information gathering. The primary statistical data may include, but not limited to such directly measurable quantities such as: engaged or available time(s), locations; locations traversed including speed and direction; listen time; talk time; number of listeners, geographic location of the speakers and listeners; type of communication (e.g., broadcast, private conversations with individuals, private conversations with groups, interruptions, group conversations, announcements, interrupting announcements, mandatory response messages, voice-to-machine, machine-to-user, initiation of requests for action, responses to requests for action, etc.); number and role of listeners to messages sent to the system; length of the communication session(s); location of said communications for initiating devices, users or external systems, participants in the form of devices or users or external systems, destination devices, users or external systems; instructions sent or received from external systems of communications; keywords spoken or listened to; intonation; speech cadence, banter rate, emotion and inflection; lengths of speech segments; locations traversed by users or devices including speed and direction; when, where, and for how long two or more users or devices dwell in close proximity to other users of the observation platform, or to visitors to the enterprise, or to specific locations, or to other external devices such as beacons, IoT devices or kiosks; the speed of movement for talking or listening devices or users during/after talking or listening; time in specified zones and not in specified zones; the frequency that listeners delay hearing a message or drop out from what a speaker is saying, or delete a message before hearing it from a user or device; number and type of questions asked and how long the question takes to ask; number and type of questions answered, and how long it takes to initially respond and then communicate the answer to the question; number and type of action requests initiated from users or external systems and number and type of action requests responded to from users or external systems, from where, to where and associated motions; promptness of responses to what was heard from users or from external systems; promptness of responses to what was heard; other audible or sub-audible sounds captured by the wearable; button presses and button press durations as initiated by the user; inertial measurement unit (IMU) data; radio signal strength (RSS) data; signal to noise ratio (SNR) data; interfering signal data; battery charge state data; temperature data; and (X,Y,Z) location data for all users, devices or other systems capable of being tracked or reporting location information. Finally, the primary statistics will include any policies which are invoked by the observation platform for the communications between users or external systems. Time of day will normally be included in each primary statistic. These items may also be referred to as first order data and metrics, primary observation, primary metrics, or primary characteristics.

Subjective Statistics: Those numerical and text-based statistics provided through mechanisms such as: polling other users, visitors or through polling from external systems; surveying other users, visitors or through surveying from external systems; getting survey-like feedback for a user following a contact or close proximity detection with a visitor as determined by the policy used by the observation platform; getting survey-like feedback for a user following a contact or close proximity detection another user as determined by the policy used by the observation platform; comments, notes and interpretations provided directly by the user; comments, notes and interpretations provided by management regarding the user;

Sociability Statistics: Quantified metrics that conveys the ability and willingness of a person to communicate, educate, or engage with others. May also be referred to as social engagement quotient (SEQ), social quotient (SQ), social skills, people skills, social factors, or social potential. [See U.S. Pat. No. 9,053,449 entitled "Using Structured Communications to Quantify Social Skills, assigned to the assignee and incorporated by reference herein]

External Statistics: Those numerical observations that are useful in generating Secondary Statistics or higher-order statistics but that come from outside the scope of the observation platform. One example is the gross sales receipts from a cash register which might be tied statistically to circumstances visible to the observation platform via an observed basket identification. A second example would be some measurement of shopper locations by an external smartphone application. These numerical statistics may be gathered by the external system which then reports the data to the observation platform; or may be gathered by the observation platform working together with the external system to coordinate user context and locations; or may be gathered by the observation platform using data it requests from the external systems to derive the external statistic. May also be referred to as external observations.

Secondary Statistics: Those numbers generated through the application of Inference rules, combinatorial rules and policy controls and feedback from the primary statistics, subjective statistics, sociability statistics and the external statistics. These items may also be referred to as second order data and metrics, secondary observations, secondary metrics, or secondary characteristics. Contextual information and higher-order statistics may be derived from secondary statistics and may be used for determination of message flow, device actions, and control of all users and devices connected to the observation platform. Secondary statistics include data relative to user performance and to system and device performance.

Higher-order Statistics: Those numbers generated through the application of Inference rules or combinatorial rules from the primary statistics or secondary statistics. Additionally, the higher-order statistics form the basis for calculating a user's performance score using statistical categories such as, but not limited to: user performance score relative to others in the same or similar environments, user performance scores relative to others with the same or similar roles and responsibilities, user ranking against other users, user ranking against established performance norms; the establishment or adjustment of performance norms and performance benchmarks for roles, responsibilities, environments, zones within environments, titles, geographic regions, enterprise functions and enterprise size. May also be referred to as higher-order observation or higher-order metrics.

Enterprise Performance Data: Goals and results, expressed as metrics or numbers, that comprise both a specification of what is important in targeted performance and that also contain historical data which can be useful in learning about what seems to matter, either through human insight or intuition, or through machine-learning via an algorithmic procedure. May also be referred to as outcome data or desired objectives.

Inference rule: A specific algorithmic procedure for processing a specified set of input data to produce a specified set of output data. At the simplest, the procedure may be to construct a weighted sum of the inputs to produce a single output number. May also be referred to as combinatorial rule.

Validated Rules: Inference rules that have been proved to have a useful and meaningful correlation to desired objectives by comparing the higher order statistics that they generate to those objectives. Also, those Inference rules where the strength of the weights or the size of the other numerical values in the rule are adjusted to optimize the observed correlation. May also be referred to as verified.

Modeling: Using either the verified or tuned Inference rules or the employee and team performance metrics as inputs to a business model in order to calculate a modeled result corresponding to the desired objectives. May also be referred to as forecasting.

Human-generated Hypothesis: Inference rules guessed by 'common-sense' or expert opinion, possibly followed by a tuning step using comparison with historical data. May also be referred to as expert-generated hypothesis or expert-generated relationship.

Machine-generated Inference rule: Inference rules generated at least in part by an algorithmic procedure, and then tuned to validate and optimize the observed correlation to objectives. May also be referred to as machine-generated hypothesis or machine-generated relationship.

Measuring User Performance Through the Observation Platform

Embodiments of the present technology are for using structured communications to measure and quantify performance metrics such as, but not limited to: personal performance, performance within groups, performance within an enterprise environment, relative ranking against others in the same or similar environment, relative ranking against others with the same or similar roles and responsibilities, assessment and quantification of sociability skills and benchmarking of this set of metrics for use across similar environments, geographies or roles. The data is gathered using an observation platform that may involve a number of users, devices, other computer systems and external IoT devices which provides structured and disciplined communications and captures data regarding the communications and devices in the Primary Statistics.

Employee data is gathered by the observation platform and includes data from five general categories of input information: Employee conversations, queries, responses, intonation, voice cadence, geographic locations and motions; Employee interactions with external systems and databases connected to the observation platform; Employee interactions with IoT devices connected to the observation platform; Subjective data gathered within the observation platform or reported to the observation platform by external systems; and Subjective data manually entered into the observation platform or reported to the observation platform by other employees, visitors, customers or managers A performance metric may also be a metric, a key performance indicator (KPI) or a business metric. A metric or performance metric as referred to herein may be any type of data associated with or derived from communication between users, including the location of the communications device, or the words spoken and the contextual state at the time of a particular communication event. Additional information and data is generated and collected from proximity information between devices and proximity information with stationary or visitor beacons or radio signals. In one embodiment, the computer system is able to generate a visual representation of metrics. For example, the visual representation may be a map of the geographic location of the users in an environment or may be a visual indication of the availability status of a user.

In another example, the visual representation may be textual information such as the number of communications sent by a user or the length of time it took for a user to respond to a communication. The performance metrics may be sent in near-real-time as an audio message or displayed to a manager or other user for use in making decisions and directing actions. The performance metrics may be used by the manager to optimize customer service in a retail setting by taking actions such as reprimanding or rewarding an associate, combining groups or teams of associates with differing and necessary behaviors, skills or talents as recorded by the observation platform, or being informed that no associates are located near a group of customers or in a specific location zone. Performance metrics may also generate real-time alerts and alarms or notifications that action, intervention or coordination is needed. These alerts and alarms are also routed to the most appropriate users based on context, policy and inference.

An employee's past work experience alone is not the leading indicator of whether or not the employee is influential or a "go-to" person in the particular retail setting. To achieve this informal status, the employee not only needs to be viewed as having the knowledge that others need, but they also need to have other factors such as being approachable, being positive in attitude and actions, and/or socially available and responsive for customers and employees to engage with them. These other factors may be described as sociability factors, sociability potential, or social skills.

Managers in the retail setting may be able to determine or measure the employee's experience through their length of service or subject expertise, but when it comes to an objective measurement of responsiveness, helpfulness, being at the right place at the right time, effectiveness in current role, competence with external system, sociability factors or social skills, managers have few tools with which to measure, quantify, evaluate and compare an employee's effectiveness other than subjective anecdotal or gut feelings. Consequently, when managers are transferred or quit, this learned anecdotal knowledge often leaves with them and an incoming manager has to learn the behavioral patterns from scratch. It is also challenging to measure performance factors in prospective employees during the new hire process and probationary period.

The present technology operates by using an observation platform, devices, IoT devices, external systems and structured communications from which to gather or collect primary statistics that may be used to generate secondary statistics or higher-order statistics. The primary statistics, secondary and higher-order statistics are utilized as a part of an assessment of the performance and behaviors of a user in the observation platform.

The assessment may be used by the enterprise, a manager, others, or computer systems to make decisions for promotions, demotions, lateral transfers, temporary assignments, interventions, leveraging talents, sharing skills and combining individuals into teams, measuring assimilation rates for new employees, or for the obtaining of other goals. The present technology may be to run continuous assessments of people skills and productivity metrics, including the dependency on context, and then to use the assessments to guide planning, discover causes, provide training, and make the management task more effective by having objective data. The present technology includes the concept of quantifiable 'sociability scoring,' and the profit-making potential of employing measured characteristics for the training, deployment, alignment, assessment, assimilation and management of store personal. It should be appreciated that the present technology may extend to other environments besides a retail setting wherever it is useful to assess human performance and organize humans into groups depending on their social skills.

The present technology uses the observation platform to intercept a communication or instruction from a first device at a computer system and relay the communication or instruction to a second device or second computer system where the first computer system determines the relayed destination by deriving context information from the communication and/or stored data relevant to the communication. The first computer system measures or collects Primary Statistics related to the devices, the communication and any external computer systems or IoT devices. The primary statistics can be then used to generate secondary statistics to generate or create an assessment of a user associated with the device. A specific user may be associated with a device based on matching characteristics of the user; as determined by comparing current characteristics against prior primary and secondary statistics to derive the identity of the user. The user may more directly identify themselves to the system through voice printing (identification of the user by the sounds of their voice), by saying a key phrase or saying their name or an ID number.

The primary, secondary and higher-order statistics resulting in performance assessments are the quantified performance score of the user. The assessment is then made available to a manager, others or a computer system for use in aligning performance with the company's goals. For example, the manager may create a work schedule of employees using the assessment to ensure that a "go-to" person is scheduled for each shift. Thus the present technology may be used to measure or quantify high-performance or low-performance skills of employees, the types of skills and talents the employees demonstrates, areas needing improvement and areas where that employee might be helpful to others. The subjective and quantitative employee performance information can then be made available for managers, others or external computer systems to use in making staffing, team selection, and role decisions.

Data Collection, Categorization and Generation of User Performance Metrics

The observation platform collects statistics for all users and devices connected through the system or connected to the system. Aggregation and manipulation of the primary statistics into secondary statistics and potentially into Higher-order Statistics results in many categories of statistics that indicate the performance of an employee while in the environment of the observation platform.

Two broad categories of data are collected within the observation platform environment: objective data, and subjective data. Algorithms within the computer system attached to the observation platform then combine the data using policy and weighting factors provided by the enterprise or the defaulted to the observation platform system. The output of the algorithm becomes a component of the employee score that is either explicitly displayed or used internally for the computation of a Higher-order statistic that indicates a component of the employee performance score that is explicitly displayed.

In one embodiment, objective and subjective data may be combined to yield a performance score. For example, a manager may highly value time-in-zone, an objective primary statistic, with a weighting factor that is important to his business. The weighting factor is a subjective data element that is combined by the algorithm and policy within the observation platform which yields a performance score element for the user.

As one case, performance metrics can use location information as one Primary Statistic combined with other contextual information to produce secondary and higher-order statistics indicating the personal productivity metrics for the user.

In one embodiment, quantifying the percent of time a device or user spends in an assigned zone, the motion within that zone, the movement speed within the zone, the comparison of motion in the zone to outside of the zone or with other specified zones are combined to indicate performance factors such as energy, attentiveness and urgency. By measuring the relative time spent in other zones, the algorithm can determine the degree of task focus and attention to visitors or shoppers. By measuring the user communication patterns within and outside of the zone of interest, the algorithm can determine such performance factors as focus, helpfulness, inquisitiveness, depth of knowledge for the zone contents or function, and the willingness to follow instructions.

In one embodiment, counting the number of times a user (User A) requests the location of another user (User B) as a primary statistic, can be used to determine secondary or higher-order statistics that score how much a person is relied on in the enterprise and how often people want to find them (User B) or how well a manager is keeping up with situational awareness by checking the locations of employees (User A).

In one embodiment, counting the number of times a user (User A) requests "Who is near" a specific location to hear a list of employees and their status within that location, results in a primary statistic that can be used to determine secondary or higher-order statistics that score how much attention that user (User A) is paying to the situational awareness of the store or enterprise.

As one case, performance metrics can be derived from request and response data as one Primary Statistic combined with other contextual information to produce secondary and higher-order statistics indicating the personal productivity metrics for the user. The request and response function includes all cases where the system; an external device (e.g., IoT or a smartphone); a policy; a message distributed to individuals, groups, districts or regions; or the context of the user creates the need for an action requiring a response from one or a plethora of users.

In one embodiment, using and measuring request-and-response functions, with or without location data, as a primary statistics can be used to derive secondary and higher-order statistics that determine performance factors such as: response speeds, personal urgency, urgency to support others, team commitment, and personal energy levels. By comparing the request-and-response behaviors day-to-day, trends can be uncovered indicating employee motivation and employee reliability on a long-term or a daily basis.

In one embodiment, using and measuring request-and-response functions for expert groups, with or without location data, as a primary statistics can be used to derive secondary and higher-order statistics that determine if new employees are curious about products, services or processes and if existing employees are willing to share knowledge and their depth of knowledge by subject. The algorithm thus determines performance factors such as: employee inquisitiveness, depth of subject knowledge, willingness to share knowledge and speed of integration into the enterprise.

In one embodiment, combining verbal question-and-answer functions, with location data can be used by the algorithm to determine performance factors such as: product knowledge, team commitment, inquisitiveness, aptitude for products or functions within the zone, and team helpfulness.

TABLE 1

Request and Response Examples

| Primary Function | Primary Statistics | Secondary and Higher-order Statistics (Performance Measurements) |
|---|---|---|
| Expert Group - Asking Questions about Processes | Count of questions asked by user, times, locations where asked, locations where answered, time to answer, length of answer, number of users listening to answer, number of users NOT listening to answer, keywords in question, keywords in answer, number of questions not listened to, requests heard and NOT responded to. | Inquisitiveness, assimilation status and rate, knowledge topics, depth of process knowledge, willingness to share knowledge, consistency of actions |
| Expert Group -- Asking Questions about Products | Count of questions asked by user, times, locations where asked, locations where answered, time to answer, length of answer, number of users listening to answer, number of users NOT listening to answer, keywords in question, keywords in answer, number of questions not listened to, requests heard and NOT responded to. | Inquisitiveness, assimilation status and rate, knowledge topics, depth of product knowledge, willingness to share knowledge, consistency of actions |
| Zone-coverage alerts - Receiving alerts that a zone is not staffed or is overstaffed | Measure reaction time to respond to the request, number of requests responded to, time to arrive at the coverage location, locations where time spent, speed traveled, path traversed, requests heard and NOT responded to. | Team support, customer affinity, understanding of role, job urgency, environmental awareness. |
| Kiosk alerts - Receiving alerts that a visitor is engaged with a kiosk and may need attention | Measure reaction time to respond to the request, time to arrive at the correct location, speed traveled, path traversed, speed to arrive in proximity of visitor or shopper, length of time spent in location or in the proximity of the visitor, visitor feedback from external devices or systems used by visitors or customers, customer feedback rating from another user of the system, requests heard and NOT responded to, relationship of user role to the kiosk function. | Urgency to support shoppers or visitors, helpfulness, depth of knowledge regarding kiosk products or information presented, awareness of priorities, customer satisfaction scores. |
| "Soft button" alerts- receiving alerts that a visitor has pressed a button or has verbally requested help or information and they are expecting some action | Measure reaction time to respond to the request, time to arrive at the correct location, speed traveled, path traversed, speed to arrive in proximity of visitor or shopper, length of time spent in location or in the proximity of the visitor, visitor feedback from external devices or systems used by visitors or customers, customer feedback rating from another user of the system, requests heard and | Urgency to support shoppers or visitors, helpfulness, depth of knowledge regarding button location products, awareness of priorities, customer satisfaction scores |

TABLE 1-continued

Request and Response Examples

| Primary Function | Primary Statistics | Secondary and Higher-order Statistics (Performance Measurements) |
|---|---|---|
| | NOT responded to, relationship of user role to the kiosk function. | |
| Buy-on-line, fulfill-in-store requests - alerts or requests from omni-channel sources that inventory needs to be verified or held | Measure reaction time to respond to the request, time to arrive at the inventory location, speed traveled, path traversed, speed to verify inventory, speed to move inventory to holding location, voice inflections | Urgency in inventory verification, inventory location knowledge, desire to assist, team cooperation and support |
| Pick-up requests - requests for products to be delivered to specific locations | Measure reaction time to respond to the request, time to arrive at the inventory location, speed traveled, path traversed, speed to verify inventory, locations visited, voice inflections, visitor feedback from external devices or systems used by visitors or customers | Urgency to support shoppers or visitors, helpfulness, desire to assist, customer satisfaction scores. |
| Inventory verification requests - requests from systems or other stores to validate inventory status | Measure reaction time to respond to the request, time to arrive at the inventory location, speed traveled, path traversed, speed to verify inventory, locations visited, voice inflections, speech cadence | Urgency in inventory verification, inventory location knowledge, desire to assist, team cooperation and support |
| Responding to location based tasks - tasks that are heard when a user moves into a specific zone | Measure times through zone with and without action, speed through zone, adjacency to visitors or shoppers while passing through zone, time to close task after entering zone, voice inflections, speech cadence, subject feedback on quality and completeness of task within zone, task requests heard and NOT responded to. | Task orientation, willingness to take on new tasks, task efficiency, quality of workmanship, affinity to types of tasks |

In one embodiment, combining proximity information by detecting shopper or visitor devices using beacons, near-field or other technologies such as RFID, with location data of the device can be used by the algorithm to determine performance factors such as: shopper or visitor helpfulness, efficiency in helping shoppers or visitors, desire to engage shoppers or visitors, effectiveness in engaging shoppers or visitors and effectiveness in supporting shoppers or visitors by high-value items or functions within the zone.

In one embodiment, combining proximity information by detecting other observation platform user devices, with location data can be used by the algorithm to determine performance factors such: as team leadership, training or teaching efforts, time wasting or cooperativeness.

In one embodiment, combining point of sale (POS) information, with location data can be used by the algorithm to determine performance factors such as: selling effectiveness within assigned zone, selling effectiveness in other zones, attention to basket size, conversion rate scores, attention to product margins.

In one embodiment, combining shopper or visitor feedback information gathered by shopper or visitor applications that are able to detect the observation platform user, with location data can be used by the algorithm to determine performance factors such as: customer satisfaction scores by zone covered, customer satisfaction vs. time spent with the customer, and other performance metrics as derived from survey tool applications used by the shopper or visitor In a different case, performance metrics can use external system instructions as one primary statistic combined with other contextual information to produce secondary and higher-order statistics indicating the personal productivity metrics for the user.

In one embodiment, combining shopper or visitor encounter information gathered by detecting shopper or visitor applications using BLE, Bluetooth, Cellular or WiFi signal detection, with external system instructions can be used by the algorithm to determine performance factors such as: social interaction scores, helpfulness scores, shopper or visitor attentiveness scores, and urgency to assist scores.

In one embodiment, combining task requests originating from external system instructions with other context information can be used by the algorithm to determine performance factors such as: reaction time to pick up assigned or requested tasks, reaction time to verify on-shelf or backroom inventory, task compliance performance, task urgency compliance, and competitiveness scores.

In one embodiment, combining time-clock information from external systems with user behavior within the observation platform environment can be used by the algorithm to determine performance factors such as: ability to plan actions, ability to complete tasks in a timely manner, ability to complete tasks within daily deadlines, and ability to keep to schedules.

In one embodiment, combining video camera information from external systems with user behavior within the observation platform environment can be used by the algorithm to determine performance factors such as: ability to address customers or visitors appropriately, ability to recognize poor coverage zones or assist groups of customers or visitors, urgency to address loss prevention alerts, ability to assist and support diverse cultures of customers or visitors.

In a different set of cases, performance metrics can use information manually entered into either the observation platform or an external system as one Primary Statistic combined with other contextual information to produce Secondary and Higher-order statistics indicating the personal productivity metrics for the user.

In one embodiment, combining external, manually entered information with user behavior and context within the observation platform environment can be used by the algorithm to determine performance factors such as: absorption and application of course work completed, absorption and application of video, audio or other training methodologies, absorption and application of brand-oriented messages and information provided by the enterprise, and correlation of course grades to the application of the material in the observation environment.

In one embodiment, combining external, manually entered information from customers or visitors that is requested via an application running on a device carried by the customer or visitor, with user behavior and context within the observation platform environment can be used by the algorithm to determine performance factors such as: customer satisfaction scores, ability to pay attention and focus, ability to answer questions, demeanor, helpfulness, alertness, depth of knowledge, and breadth of knowledge.

In one embodiment, combining external, manually entered information from other users of the system or peers, which is requested via an application running on a device carried by the user or from a terminal connected to the observation platform, with user behavior and user context within the observation platform environment can be used by the algorithm to determine performance factors such as: team player scores, helpfulness scores, knowledge sharing scores, customer satisfaction scores, demeanor toward co-workers, alertness, depth of knowledge, and breadth of knowledge.

In one embodiment, combining external, manually entered information from other users of the system or peers, which is requested via a scheduled process or adjusted by enterprise policy controlling the scheduled process within the observation platform, with user behavior and user context within the observation platform environment can be used by the algorithm to determine performance factors such as: progress toward goals, team player scores, helpfulness scores, knowledge sharing scores, customer satisfaction scores, demeanor toward co-workers, alertness, depth of knowledge, and breadth of knowledge.

In one embodiment, combining external, manually entered information from the primary user with that same user's behavioral data and context within the observation platform environment can be used by the algorithm to determine performance factors such as: progress toward goals, new potential goals, attitude towards tasks, goals, career and company; team player scores; demeanor toward co-workers or managers; desire for improvement; and willingness to accept feedback. Additionally, users can offer commentary, explanations or rebuttals to the objective performance scores in the system.

In one embodiment, combining external, manually and automatically entered information regarding length of employment and past roles and responsibilities can be used by the algorithm to determine performance factors such as: progress toward goals, new potential goals, attitude towards tasks, goals, career and company; team player scores; demeanor toward co-workers or managers; desire for improvement; willingness to accept feedback; and other career determining or limiting factors.

In one embodiment, combining information from point-of-sale (POS) systems with the primary and secondary statistics of the user, especially proximity information gathered by beacons or BLE connections, can be used by the algorithm to determine performance factors such as: sales effectivity/efficiency (e.g., sales dollars per minute spent with shoppers), ability to upsell and influence add-on purchases, ability to move the shopper to different departments and increase basket size, ability to create conversions (sales) with shorter customer encounters.

Example algorithms for producing quantified performance measurements and metrics are shown in the table below. These algorithms represent one of many possible calculations for each performance metric. The algorithm examples use the coefficient "C" as a normalizing and weighting factor for each performance category. The other capital letter coefficients are used within the algorithm to weight each performance factor. All of these coefficients many be adjusted based on the business requirements of each environment.

| Primary Function | Typical Algorithm Shown as an Example | Result |
|---|---|---|
| Expert Group-Asking Questions about Processes [Process questions are identified by either a specific command or a recognized set of keywords] | Inquisitiveness: C[+M(number of questions asked/user-hr) + N(number of questions listened to/user-hr) + P(time spent listening to answers/user-hr) − Q(number of questions NOT listened to/user-hr)] Assimilation Status: C'[+M(number of questions asked/user-hr) + N(number of questions listened to/user-hr) + A(the number of questions answered/ user-hr) − T(average response time to answer a question) − Q(number of questions NOT answered/user-hr)] Assimilation Rate: (the linear slope of the above equation computed over an interval of time) Depth of Process Knowledge: C"[−M(number of questions asked/user-hr) + A(the number of | A numerical value normalized in the range of typically 0-100 (by the constant value of C) indicating the performance of the user for the category. For "Knowledge Topics" the result is list of keyword topics in ranked order of frequency of responding. |

| Primary Function | Typical Algorithm Shown as an Example | Result |
|---|---|---|
| | questions answered/user-hr) + W(the number of users who listen to the full answer) − X(the number of users who do NOT listen to full answer) − T(average response time to answer a question) − Q(number of questions NOT answered/user-hr)] <br> Willingness to Share Knowledge: C'''[+A(the percentage of questions answered) − T(average response time to answer a question) − Q(number of questions NOT answered/user-hr)] <br> Consistency of Actions: Consistency is computed as the standard deviation (or other statistical model) for the set of characteristics defined above. <br> Knowledge Topics: [keyword]*C'''[M(number of questions asked/user-hr) + N(number of questions listened to/user-hr) + A(the number of questions answered/user-hr) − T(average response time to answer a question) − Q(number of questions NOT answered/user-hr)] | |
| Expert Group-- Asking Questions about Products [Product questions are identified by either a specific command or a recognized set of keywords] | Inquisitiveness: C[+M(number of questions asked/user-hr) + N(number of questions listened to/user-hr) + P(time spent listening to answers/user-hr) − Q(number of questions NOT listened to/user-hr)] <br> Assimilation Status: C'[+M(number of questions asked/user-hr) + N(number of questions listened to/user-hr) + A(the number of questions answered/ user-hr) − T(average response time to answer a question) − Q(number of questions NOT answered/user-hr)] <br> Assimilation Rate: (the linear slope of the above equation computed over an interval of time) <br> Depth of Process Knowledge: C''[−M(number of questions asked/user-hr) + N(number of questions listened to/user-hr) + A(the number of questions answered/user-hr) + W(the number of users who listen to the full answer) − X(the number of users who do NOT listen to full answer) − T(average response time to answer a question)-Q(number of questions NOT answered/user-hr)] <br> Willingness to Share Knowledge: C''[+A(the percentage of questions answered) − T(average response time to answer a question) − Q(number of questions NOT answered/user-hr)] <br> Consistency of Actions: Consistency is computed as the standard deviation (or other statistical model) for the set of characteristics defined above. <br> Knowledge Topics: [keyword]*C''[M(number of questions asked/user-hr) + N(number of questions listened to/user-hr) + A(the number of questions answered/user-hr) − T(average response time to answer a question) − Q(number of questions NOT answered/user-hr)] | A numerical value normalized in the range of typically 0-100 (by the constant value of C) indicating the performance of the user for the category. <br><br> For "Knowledge Topics" the result is list of keyword topics in ranked order of frequency of responding. |
| Zone- coverage alerts- Receiving alerts that a zone is not staffed or is overstaffed | Team Support: C[T(average proximity to other users) + R(reaction time to respond to a request) − S(average time to arrive at the coverage location) + L(speed traveled) + N(number of requests responded to/user-hr) − Q(number of requests NOT responded to/user-hr)] <br> Customer Affinity: C'[+R(reaction time to respond to a request) − S(average time to arrive at the coverage location) + L(speed traveled) + N(number of requests responded to/user-hr) − Q(number of requests NOT responded to/user-hr)] <br> Understanding of Role: C''[A(time spent in target location) + R(reaction time to respond to a request) − S(average time to arrive at the coverage location) + L(speed traveled) + N(number of requests responded to/user-hr) − Q(number of requests NOT | A numerical value normalized in the range of typically 0-100 (by the constant value of C) indicating the performance of the user for the category. |

| Primary Function | Typical Algorithm Shown as an Example | Result |
|---|---|---|
| | responded to/user-hr)]<br>Job Urgency: C'''[A(time spent in target location) + R(reaction time to respond to a request) − S(average time to arrive at the coverage location) + L(speed traveled)]<br>Environmental Awareness: C''''[A(time spent in target location) + B(number of other locations visited/user-hr) − C(number of locations not visited/user-hr) − P(the path length traveled vs. the average path length for all users between the starting point and the ending point)] | |
| Kiosk alerts-Receiving alerts that a visitor is engaged with a kiosk and may need attention | Urgency to Support Visitors: C[+R(reaction time to respond to a kiosk request) − S(average time to arrive at the coverage location) + L(speed traveled) + N(number of requests responded to/user-hr) − Q(number of requests NOT responded to/user-hr)]<br>Helpfulness: C'[+R(reaction time to respond to a kiosk request) − S(average time to arrive at the coverage location) + L(speed traveled) + N(number of requests responded to/user-hr) − Q(number of requests NOT responded to)] + T(time spent at the kiosk location) + V(time spent in the proximity of the visitor)]<br>Depth of Knowledge Regarding Kiosk Products: C''[+R(reaction time to respond to a kiosk request) + A(the number of questions with relevant keywords answered/user-hr) + W(the number of users who listen to the full answer) − X(the number of users who do NOT listen to full answer) − T(average response time to answer a question with relevant keywords) − Q(number of questions NOT answered/user-hr) with relevant keywords]<br>Awareness of Priorities: C'''[+R(reaction time to respond to a kiosk request) − S(average time to arrive at the coverage location) + L(speed traveled) + N(number of requests responded to/user-hr) − Q(number of requests NOT responded to)] + E(relationship of role to kiosk function)]<br>Customer Satisfaction Scores: C''''[+R(reaction time to respond to a kiosk request) − S(average time to arrive at the coverage location) + L(speed traveled) + N(number of requests responded to/user-hr) − Q(number of requests NOT responded to)] + F(customer feedback scores collected from kiosk or applications related to kiosk) + G(customer feedback rating from another user of the system)] | A numerical value normalized in the range of typically 0-100 (by the constant value of C) indicating the performance of the user for the category. |
| "Soft button" alerts-receiving alerts that a visitor has pressed a button and expecting some action | Urgency to Support Visitors: C[+R(reaction time to respond to a kiosk request) − S(average time to arrive at the coverage location) + L(speed traveled) + N(number of requests responded to/user-hr) − Q(number of requests NOT responded to/user-hr)]<br>Helpfulness: C'[+R(reaction time to respond to a kiosk request) − S(average time to arrive at the coverage location) + L(speed traveled) + N(number of requests responded to/user-hr) − Q(number of requests NOT responded to/user-hr)] + T(time spent in the proximity of the soft button location) + V(time spent in the proximity of the visitor)]<br>Depth of Knowledge Regarding Kiosk Products: C''[+R(reaction time to respond to a soft button request) + A(the number of questions with relevant keywords answered/user-hr) + W(the number of users who listen to the full answer) − X(the number of users who do NOT listen to full answer) − T(average response time to answer a question with relevant keywords) − Q(number of questions NOT answered/user-hr) with relevant keywords] | A numerical value normalized in the range of typically 0-100 (by the constant value of C) indicating the performance of the user for the category. |

| Primary Function | Typical Algorithm Shown as an Example | Result |
|---|---|---|
| | Awareness of Priorities: C"[+R(reaction time to respond to a kiosk request) − S(average time to arrive at the coverage location) + L(speed traveled) + N(number of requests responded to/user-hr) − Q(number of requests NOT responded to)] + E(relationship of role to soft button request type)]<br>Customer Satisfaction Scores: C""[+R(reaction time to respond to a kiosk request) − S(average time to arrive within proximity of the soft button) + L(speed traveled) + N(number of requests responded to/user-hr) − Q(number of requests NOT responded to)] + F(customer feedback scores collected from soft button or applications related to soft button) + G(customer feedback rating from another user of the system)] + V(positive voice inflection scores for communications over the past T user-hrs) | |
| Buy-on-line, pick-up-in-store (BOPIS) requests- alerts or requests from omni-channel sources that inventory needs to be verified or held | Urgency in Inventory Verification: C[+R(reaction time to respond to a BOPIS request) − S(average time to arrive at the inventory location) + L(speed traveled) + N(number of BOPIS requests responded to/user-hr) − Q(number of BOPIS requests NOT responded to/user-hr)]<br>Inventory Location Knowledge: C'[+R(reaction time to respond to a BOPIS request) − S(average time to arrive at the inventory location) + L(speed traveled) − P(the path length traveled vs. the average path length for all users between the starting point and the ending point)]<br>Desire to Assist: C"[+R(reaction time to respond to a BOPIS request) − S(average time to arrive at the product location) + L(speed traveled) + N(number of requests responded to/user-hr) − Q(number of requests NOT responded to/user-hr)] + E(relationship of role to BOPIS request type)]<br>Team Cooperation: C'''[+R(reaction time to respond to a BOPIS request) − S(average time to arrive at the product location) + L(speed traveled)+N(number of requests responded to/user-hr) − Q(number of requests NOT responded to/user-hr)] + V(positive voice inflection scores for communications over the past T user-hrs) | A numerical value normalized in the range of typically 0-100 (by the constant value of C) indicating the performance of the user for the category. |
| Pick-up or Carry Out requests- requests for products to be delivered to specific locations | Urgency to Support Visitors: C[+R(reaction time to respond to a request) − S(average time to arrive at the required location) + L(speed traveled) + N(number of requests responded to/user-hr) − Q(number of requests NOT responded to/user-hr)]<br>Helpfulness: C'[+R(reaction time to respond to a request) − S(average time to arrive at the required location) + L(speed traveled) + N(number of requests responded to/user-hr) − Q(number of requests NOT responded to/user-hr)] + T(time spent from arriving at the required location to indicating the task is complete) + V(time spent in the proximity of the visitor)]<br>Desire to Assist: C"[+R(reaction time to respond to a request) − S(average time to arrive at the required location) + L(speed traveled)+N(number of requests responded to/user-hr) − Q(number of requests NOT responded to/user-hr)] + E(relationship of role to Pick-up or Carry Out request type)]<br>Customer Satisfaction Scores: C'''[+R(reaction time to respond to a request)- S(average time to arrive within proximity of the request) + L(speed traveled) + N(number of requests responded to/user-hr) − Q(number of requests NOT responded to/user-hr)] + F(customer feedback scores collected from | A numerical value normalized in the range of typically 0-100 (by the constant value of C) indicating the performance of the user for the category. |

| Primary Function | Typical Algorithm Shown as an Example | Result |
|---|---|---|
| | an application running in a visitor device) + G(customer feedback rating from another user of the system)] + V(positive voice inflection scores for communications over the past T user-hrs) | |
| Inventory verification requests- requests from systems or other stores to validate inventory status | Urgency in Inventory Verification: C[+R(reaction time to respond to a verification request) − S(average time to arrive at the inventory location) + L(speed traveled) + N(number of verification requests responded to/user-hr) − Q(number of verification requests NOT responded to/user-hr)] Inventory Location Knowledge: C'[+R(reaction time to respond to a verification request) − S(average time to arrive at the inventory location) + L(speed traveled) − P(the path length traveled vs. the average path length for all users between the starting point and the ending point)] Desire to Assist: C"[+R(reaction time to respond to a verification request) − S(average time to arrive at the required location) + L(speed traveled) + N(number of verification requests responded to/user-hr) − Q(number of verification requests NOT responded to/user-hr)] + E(relationship of role to inventory verification request type)] Team Cooperation: C'''[+R(reaction time to respond to an inventory verification request)- S(average time to arrive at the product location) + L(speed traveled) + N(number of inventory verification requests responded to/user-hr) − Q(number of inventory verification request NOT responded to/user-hr)] + V(positive voice inflection scores for communications over the past T user-hrs) | A numerical value normalized in the range of 0-100 (by the constant value of C) indicating the performance of the user for the category. |
| Responding to location based tasks- tasks that are heard when a user moves into a specific zone | Task Orientation: C[+D((number of location-tasks accepted/user-hr)/(number of location-tasks heard/user-hr)) − T(time to indicate task completion)] Willingness to Take on New Tasks: C'[+D((number of location-tasks accepted/user-hr)/(number of location-tasks heard/user-hr)) + N(number of different locations for accepted tasks) − M(number of different locations for tasks NOT accepted) Task Efficiency: C"[+D((number of location-tasks accepted/user-hr)/(number of location-tasks heard/user-hr)) − H(time from task acceptance to task complete)] Quality of Workmanship: C"[+D((number of location-tasks accepted/user-hr) − H(time from task acceptance to task complete) + B(external rating of workmanship from other users or managers)] Affinity to Types of Tasks: C""[+D((number of location-tasks accepted/user-hr for each location)] | A numerical value normalized in the range of typically 0-100 (by the constant value of C) indicating the performance of the user for the category. For "Affinity to Types of Tasks" the result is list of task locations in ranked order of frequency of acceptance in a given location. |

Employee Performance Library

The data gathered and processed within the observation platform is unique in that enterprise or store employees have traditionally been left out of the Information Technology (IT) infrastructure unless they were at a terminal or using a hand-held device. The observation platform provides continual geographic location tracking and monitoring of all employee interactions with other employees or connected systems thus allowing the accumulation and analysis of a new set of key performance indicators (KPIs) for hourly workers.

These new KPIs are a combination of objective and subjective metrics regarding how an employee or store associate performs tasks and interacts with other peers and managers. The observation platform applies inference rules, policy and statistical approaches to the unique information gathered and creates usable, definable, benchmarkable and transferrable employee performance metrics. These metrics may then be tabulated and recorded as a part of a new kind of employee performance record.

Since the employee performance record is based on objective statistics against a history of roles and responsibilities, these KPIs may be used to indicate the performance of an employee in a new role, department, division, or in a new enterprise entirely.

Because the KPIs are useful to other organizations, divisions, departments or roles; these individual performance indicators can be made available to others in the enterprise or in other enterprises much like an "Equifax" credit score is available to banks or lenders.

The unique information gathered by the observation platform therefore allows the creation of new kind of employee performance database where objective Primary Statistical data is processed into Secondary Statistics or Higher-order Statistics indicative of an employee's past and predicted performance based on role, function or enterprise operations.

Some basic aspects of the employee scoring, rating and ranking system include, but are not limited to:

The system creating a personal performance library that may be shared with the employee, employer, the observation platform owners, or other designated organizations who may then share the information with others.

Employees being granted access to their performance data according to the enterprise policy for sharing such data. The enterprise is encouraged to share the employee information external to the enterprise and encourage other enterprises to share employee information, so they, in turn, can pre-view candidate performance information before making hiring decisions.

The employee is given tools for managing the distribution of their performance information according to the policy of the enterprise gathering the information. The tools allow accessing, reviewing, commenting and disputing the content stored in the library. The observation platform owner may also retain rights to the employee information.

The employee information library is organized with "public" and "private" areas. The enterprise, employee, or observation platform owner can, according to privacy policy, move/copy data between the private, semi-public and public areas.

Employee performance information is used for personal growth in current positions and as guide for establishing capabilities based on objective data of past performance for use in seeking more relevant or valuable employment in different roles, departments, divisions or with entirely different enterprises.

The performance information helps employees identify core strengths and roles where they will be most successful.

Performance information in the library is used by current employers or future employers as determined by the privacy policy agreed between the employee, enterprise and observation platform owner.

The current employer uses the system to measure employee assimilation or program alerts that an intervention may be helpful.

The name of the enterprise or department associated with the source of the data is made anonymous by the policies driving the decisions in the system.

The system will update the employee data in near-real-time providing a current employee performance assessment report on a daily, weekly, monthly or other basis.

The employee performance library will utilize procedures to alert the employee as changes are made to any performance category or if new performance categories are added.

Data Archiving and Security

Once the data is collected, it is archived for analysis by the inference engines; Date is parsed and may be stored in multiple tables; data is encrypted; authentication, authorization, and accounting with secure transport (AAAS) is assured; and processed data is validated against norms to eliminate errored data.

Data Manipulation and Inference

Establishment of norms by role, group, zone assignments and arbitrary factors entered by managers or system defaults; Ranking of individual performance data against norms; Weighting of data categories and norms for particular roles, groups, zones and arbitrary factors; Identification of outlier behaviors (performance significantly above or below norms); and translation function for weighting the data against the criteria for different store categories or operational models.

Some Examples of Data Elements in Employee Library

Subjective data includes: survey feedback from peers and managers; survey feedback from visitors (shoppers); disengagement feedback from visitors (shoppers); tone-of-voice quantification and calibration against individual norms; voice inflection quantification and calibration against individual norms.

Secondary and higher-order statistics indicative of employee performance includes: responsiveness to tasks; responsiveness to questions; ability to ask questions (curiosity); communication balance; communication breadth (laterally across the organization and up/down the managerial change); keeping up with messages and announcements; and prioritizing tasks.

Benchmarking data includes: establishing performance criteria for roles, locations, chains, stores, departments, and enterprises; calculating means and standard-deviations for the criteria amenable to statistical analysis; establishing a normalized benchmark for roles, location, chains, stores, departments and enterprises; and dynamically updating the benchmarks with new information.

Relative data includes: ranking within peer group; ranking within single store (office); ranking within district of stores (district or enterprise division); ranking within region of stores (geographical enterprise divisions); ranking within chain (enterprise); ranking within role (for the above); ranking for zone coverage; and ranking within industry category.

What is claimed is:

1. A method of generating performance metrics for one or more users within an observation platform environment comprising:
   providing one or more of the users with a communications device capable of sending a user's voice and a secondary signal containing information regarding a location of the communications device or a relative proximity of the communications device to other communications devices provided to others of the users; and
   providing an observation platform having a communications system for receiving and sending data from and to at least one of the communications devices, an Internet of things (IoT) device, and an external system, the observation platform comprising:
   a computer system with a memory, the computer system configured to:
      recognize a user identity of a user, of the users, based on signals from the communications device;
      capture, from the communication device, a voice message of the user and the secondary signal;
      derive statistical data about employee performance of the user comprising: primary statistics, secondary statistics, and higher-order statistics from the secondary signal and the voice message; and
      build context and a contextual history of one of the user and the communications device based on the statistical data.

2. The method as recited in claim 1, further comprising the computer system configured to:
store the context and the contextual history.

3. The method as recited in claim 1, further comprising the computer system configured to:
employ policy to generate key performance indicators for roles, groups, and the employee performance of the user.

4. The method as recited in claim 1, further comprising the computer system configured to:
utilize the primary statistics, secondary statistics, and higher-order statistics to determine a user performance score for the user.

5. The method as recited in claim 4, further comprising the computer system configured to:
utilize the primary statistics, secondary statistics, and higher-order statistics to determine a relative ranking of a plurality of user performance scores against others in the same or similar environment.

6. The method as recited in claim 1, further comprising the computer system configured to:
utilize the primary statistics, secondary statistics, and higher-order statistics to determine a relative ranking against others with the same or similar roles and responsibilities.

7. The method as recited in claim 1, further comprising the computer system configured to:
utilize the primary statistics, secondary statistics, and higher-order statistics to determine a benchmark for user performance for the user.

8. The method as recited in claim 1, further comprising the computer system configured to:
use speech recognition to convert speech in the voice message to one of text and a machine-compatible format.

9. The method as recited in claim 1, wherein the deriving statistical data about employee performance of the user comprises the computer system configured to:
use the primary statistics to derive the secondary statistics and the higher-order statistics.

10. A non-transitory computer-readable storage medium having instructions stored thereon which, when executed by a computer system, cause the computer system to perform a method of generating performance metrics for one or more users within an observation platform environment having a communications system for receiving and sending data from and to at least one of a plurality of communications devices, an Internet of things (IoT) device, and an external system, the method comprising:
recognizing, by the computer system, a user identity of a user, of the one or more users, based on signals from a communications device provided to the one or more users, the communications device capable of sending a user's voice and a secondary signal containing information regarding a location of the communications device or a relative proximity of the communications device to other communications devices provided to others of the users;
capturing, by the computer system from the communication device, a voice message of the user and the secondary signal;
deriving, by the computer system, statistical data about employee performance of the user comprising: primary statistics, secondary statistics, and higher-order statistics from the secondary signal and the voice message; and building, by the computer system, context and a contextual history of one of the user and the communications device based on the statistical data.

11. The non-transitory computer-readable storage medium of claim 10, wherein the method further comprises:
storing the context and the contextual history in a memory.

12. The non-transitory computer-readable storage medium of claim 10, wherein the method further comprises:
employing policy to generate key performance indicators for roles, groups, and the employee performance of the user.

13. The non-transitory computer-readable storage medium of claim 10, wherein the method further comprises:
utilizing the primary statistics, secondary statistics, and higher-order statistics to determine a user performance score for the user.

14. The non-transitory computer-readable storage medium of claim 13, wherein the method further comprises:
utilizing the primary statistics, secondary statistics, and higher-order statistics to determine a relative ranking of a plurality of user performance scores against others in the same or similar environment.

15. The non-transitory computer-readable storage medium of claim 10, wherein the method further comprises:
utilizing the primary statistics, secondary statistics, and higher-order statistics to determine a relative ranking against others with the same or similar roles and responsibilities.

16. The non-transitory computer-readable storage medium of claim 10, wherein the method further comprises:
utilizing the primary statistics, secondary statistics, and higher-order statistics to determine a benchmark for user performance for the user.

17. The non-transitory computer-readable storage medium of claim 10, wherein the method further comprises:
use speech recognition to convert speech in the voice message to one of text and a machine-compatible format.

18. The non-transitory computer-readable storage medium of claim 10, wherein the deriving statistical data about employee performance of the user comprises:
using the primary statistics to derive the secondary statistics and the higher-order statistics.

19. An observation platform for generating performance metrics for one or more users within an environment of the observation platform, the observation platform comprising:
a communications device capable of sending a user's voice and a secondary signal containing information regarding a location of the communications device or a relative proximity of the communications device to other communications devices provided to others of the users;
a radio access point communicatively coupled with the communications devices; and
a computer system associated with the radio access point and configured to:
recognize a user identity of a user, of the users, based on signals from the communications device;
capture, from the communication device, a voice message of the user and the secondary signal;
derive statistical data about employee performance of the user comprising: primary statistics, secondary statistics, and higher-order statistics from the secondary signal and the voice message; and build context and a contextual history of the user and the communications device based on the statistical data.

20. The observation platform of claim 19, further comprising the computer system configured to:
communicate the context and the contextual history with one or more external systems, which are external to the environment of the observation platform, to facilitate communication between the one or more external systems and one or more of devices or users in the environment of the observation platform.

* * * * *